(12) United States Patent
Morimoto et al.

(10) Patent No.: US 6,813,539 B2
(45) Date of Patent: Nov. 2, 2004

(54) PARTS SUPPLYING SYSTEM OF ASSEMBLING PRODUCTION LINE AND SUPPLYING METHOD OF THE SAME

(75) Inventors: Tatsuro Morimoto, Hiroshima (JP); Takashi Matsuura, Hiroshima (JP); Hiroki Morio, Hiroshima (JP); Tetsuya Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/438,189

(22) Filed: May 15, 2003

(65) Prior Publication Data

US 2004/0002788 A1 Jan. 1, 2004

(30) Foreign Application Priority Data

May 17, 2002 (JP) ........................................ 2002-143444
Mar. 28, 2003 (JP) ........................................ 2003-091278

(51) Int. Cl.[7] .................................................. G06F 7/00
(52) U.S. Cl. ....................... 700/215; 700/213; 700/216; 700/225; 700/95; 700/99
(58) Field of Search .................................... 700/213–216, 700/223–227, 95, 97, 99, 101; 29/701, 430, 711

(56) References Cited

U.S. PATENT DOCUMENTS 5,237,508 A * 8/1993 Furukawa et al. .......... 700/100
5,329,690 A * 7/1994 Tsuji et al. .................... 29/701
5,353,230 A * 10/1994 Maejima et al. ............ 700/115

FOREIGN PATENT DOCUMENTS

JP 2000-203705 7/2000

* cited by examiner

Primary Examiner—Khoi H. Tran
(74) Attorney, Agent, or Firm—Nixon Peabody LLP; Donald R. Studebaker

(57) ABSTRACT

The invention makes it possible to efficiently and accurately supply parts to a work in an assembling production line structured as a mixed assembly line, and to improve a flexibility of changing the line. A parts supplying system of the assembling production line is provided with a working instruction server which takes in a production order information corresponding to an optional number of works, extracts the same type of works in a unit of a lot so as to sort in an order of a parts preparing work, and generates a working instruction information including a parts preparing work order, a number of the lots and an assembly parts information per the types, set containers which receive assembly parts sets to be assembled in one work, a parts setting area which has a working station provided with parts shelves for the assembly parts, and inputs the assembly parts set for the corresponding type of work to each of the set containers in the order of the parts preparing works by a unit of the same type lot, on the basis of the working instruction information, and a replacement buffer which returns each of the set containers from the parts setting area to an order of the type in accordance with the production order in the assembling production line so as to input to the assembling production line.

24 Claims, 13 Drawing Sheets

PARTS SUPPLYING SYSTEM OF ASSEMBLING PRODUCTION LINE AND SUPPLYING METHOD OF THE SAME

BACKGROUND OF THE INVENTION

1. Field of the Invention

The present invention relates to a parts supplying system and a parts supplying method for supplying assembly parts to be assembled to a work flowing in an assembling production line in which different kinds or types of works are to be assembled on the same line.

2. Description of Prior Art

Conventionally, in the case of supplying the assembly parts to be assembled in the work flowing on an assembling production line, for example, an engine assembly line for a motor vehicle, or the like, in general, a lot of parts shelves are provided along the assembly line, and various kinds of parts required for all the type of works flowing on the line are received in the parts shelves. Then, a worker sequentially selects and picks up required parts in correspondence to the flowing work from the parts shelves, and the worker sequentially assembles them to the work.

There are proposed various kinds of ideas for accurately supplying the assembly parts to the assembling production line mentioned above. For example, in Japanese Patent Laid-Open Publication No. 2000-203705, there is disclosed a receiving apparatus structured such that a photoelectric sensor is provided in each of receiving portions of parts cabinets mounted on a pallet truck of an automatic guided vehicle, thereby detecting a matter that the parts are taken in and out with respect to each of the receiving portions.

In recent years, for example, in the assembling production line such as the engine assembly line for the motor vehicle or the like, there is required a so-called mixed assembly line in which various kinds of works can be assembled and produced on the same line in correspondence to a diversification of user's preference or the like. In such a mixed assembly line, a lot of kinds of works are normally flowed in accordance with an irregular order which is not arranged per kinds or per types, for example, an order of delivery time or the like.

In the case that the conventional parts supplying system is applied to the assembling production line structured as the mixed assembly line, it is necessary for the worker to sequentially select and pick up the various kinds parts required for the work of the different type from the parts shelves in each case, in correspondence to the works which are flowed in accordance with the irregular order which is not arranged per kinds or per types. Accordingly, there are problems that a working efficiency is deteriorated and an operation mistake tends to be generated. Further, it can be considered that erroneous parts are received in the receiving portions in the parts shelves, for example, for the reason of an error at a time of putting the assembly parts in the parts shelves. Furthermore, since a lot of parts shelves are provided near the assembling production line in such a manner as to be along the line, the line lacks flexibility. In the case of changing an organization of the assembling operation in the assembling production line, there is a hard problem that a large repair operation is required.

SUMMARY OF THE INVENTION

The present invention is made by taking the technical problems mentioned above into consideration, and an object of the present invention is to make it possible to efficiently and accurately supply parts at a time of supplying assembly parts to a work in an assembling production line structured as a mixed assembly line, and to improve a flexibility of changing the line.

Accordingly, a parts supplying system of an assembling production line in accordance with one aspect of the present invention is on the premise of a parts supplying system of an assembling production line in which different kinds or types of works may be assembled in the same line. There is provided a parts supplying system of an assembling production line in which different types of works are assembled in the same line, comprising:

a host computer outputting a production management information including a production order information for a plurality of works;

a working instruction device for taking in the production management information corresponding to a preset number of works as an antecedent information coming before an actual parts preparing work, extracting the same type of works included in this intake production management information as the same type lot in a unit of a predetermined number so as to sort in an order of a parts preparing work, and generating a working instruction information including a parts preparing work order of the same type lot, the predetermined number and an assembly parts information relating to a kind and a number of the assembly parts to be assembled in the type of work each of the types;

a plurality of set containers receiving a required kind and number of assembly parts to be assembled in one work as one set of assembly parts set;

a parts setting area having a working station provided with parts shelves for receiving the assembly parts therein by the kinds, and inputting the assembly parts set for the corresponding type of work to each of the set containers in the order of the parts preparing works by a unit of the same type lot, on the basis of the working instruction information; and a set container input mechanism for returning each of the set containers to which each of the assembly parts sets is input in the parts setting area in an order of the type in accordance with the production order in the assembling production line so as to input to the assembling production line.

In accordance with this constitution, the same type of works included to the production management information are extracted as the same type lot by the unit of the predetermined number from the production order of the works in the assembling production line so as to be arranged in the order of the parts preparing works. Therefore, it is sufficient for a worker to put the assembly parts in each of the set containers by the unit of the predetermined number of same type lot in the order of the parts preparing works, in the parts setting area, even if the production order of the works in the assembling production line is the irregular order which is not arranged per types. Accordingly, with respect to the parts preparing work, the arranging operation can be carried out by the lot unit, a operation load relating to judgement of parts selection is reduced, the parts preparing work for the assembly parts supplied to the work can be extremely efficiently carried out in comparison with the conventional one, and the operational mistake can be reduced.

Further, since the required kind and number of assembly parts to be assembled in one work are received as one set of assembly parts set in the set container, and are returned to the order of the types in accordance with the production order in the assembling production line so as to be supplied to the works in the line, a load relating to an incidental operations such as a parts selecting operation, a parts picking up operation and the like can be remarkably reduced with respect to the parts assembling operation in the work, the parts assembling operation in the work can be efficiently carried out in comparison with the conventional one, and the operation mistake can be reduced.

Furthermore, since it is not necessary that a lot of parts shelves are provided along the assembling production line, a large repair operation or the like is not required even in the case that the organization of the assembling work in the assembling production line is changed, and it is possible to remarkably increase a flexibility of changing the line.

Furthermore, since it is possible to carry out the parts preparing work separately from the parts assembling operation in the work, it is possible to increase a flexibility with respect to a working time, for example, the parts preparing work is intensively carried out in one time period, whereby a lot of time is generated and is used for the other works.

In the parts supplying system having the constitution mentioned above, it is preferable that the set container input mechanism is particularly provided with a set container temporarily storing device for temporarily storing each of the set containers each receiving the assembly parts set.

In this case, it is possible to temporarily store the set containers by the unit of the same type lot in the order of the parts preparing work, in the set container temporarily storing device, and it is possible to return to the order of the types in accordance with the production order in the assembling production line. Further, it is possible to temporarily store a lot of set containers in which the assembly parts are already received by intensively carrying out the parts preparing work in one time period, in the set container temporarily storing device. In particular, it is possible to easily increase a flexibility with respect to a working time by setting a capacity of the set container temporarily storing device (a storing capacity for the set containers) larger.

Further, in the parts supplying system having the constitution mentioned above, it is preferable that a transfer route for transferring the set container together with the work in correspondence to the work flowing in the line is set in the assembling production line, and a set container temporarily extraction device for temporarily picking up the set container from the transfer route is provided in a part of the transfer route.

In this case, even if there is an area in which the set container can not be transferred approximately along the work exists in the way of the assembling production line, it is possible to deal effectively with the situation, with respect to such an area, by temporarily picking up the set container from the transfer route.

Further, a parts supplying system of an assembling production line in accordance with another aspect of the present invention is on the premise of a parts supplying system of an assembling production line in which different types of works can be assembled in the same line. There is provided a parts supplying system of an assembling production line capable of assembling different types of works in the same line, comprising:

a host computer outputting a production management information including a production order information for a plurality of works;

a working instruction device for taking in a part of the production management information as an antecedent information coming before an actual parts preparing work, and generating a working instruction information including an assembly parts information relating to a kind and a number of the assembly parts to be assembled in the type of work, in each of the types of the works included in this intake production management information;

a plurality of set containers receiving a required kind and number of assembly parts to be assembled in one work as one set of assembly parts set;

a parts setting area having a working station provided with parts shelves for receiving the assembly parts therein by the kinds, and inputting the assembly parts set for the corresponding type of work to each of the set containers, on the basis of the working instruction information;

a writing device for writing the assembly parts information corresponding to the set container on the basis of the working instruction information, with respect to a memory device provided in the set container, before inputting the assembly parts set to the set container in the parts setting area;

a reading device for reading the assembly parts information stored in the memory device of the set container input to the working station;

a display control device for displaying an object set container to be operated and the receiving portion of the parts shelves for an object parts to be put in the container, on the basis of the assembly parts information, at a time when the set containers are input to the working station;

a parts extraction detecting device for detecting a state in which the parts are picked up from each of the receiving portions of the parts shelves;

a parts receiving detecting device for detecting a state in which the parts are put in the set containers; and an informing device for informing a worker in the working station of a state in which at least any one of the parts receiving detecting device and the parts extraction detecting device is different from the working instruction information, at a time when the state is detected.

In accordance with this constitution, the required kind and number of assembly parts to be assembled in one work are received as one set of assembly parts set in the set container, and are supplied to the works in the assembling production line. Therefore, a operation load relating to incidental operations such as a parts selecting operation, a parts extraction operation and the like can be remarkably reduced with respect to the parts assembling operation in the work, the parts assembling operation can be efficiently carried out in comparison with the conventional one, and the operation mistake can be reduced.

Further, since it is not necessary that a lot of parts shelves are provided along the assembling production line, a large repair operation or the like is not required even in the case that the organization of the assembling operation in the assembling production line is changed, and it is possible to remarkably increase a flexibility of changing the line.

Furthermore, it is possible for a worker to carry out the parts preparing work separately from the parts assembling operation in the work, it is possible to increase a flexibility with respect to a working time, for example, the parts preparing work is intensively carried out in one time period, whereby a lot of time is generated and is used for the other works.

Still further, the set container to be operated and the receiving portion of the parts shelve for the parts to be put in the container are displayed, on the basis of the assembly parts information, at a time when the set container is input to the working station in the parts setting area. Therefore, a operation load relating to judgement of parts selection can be remarkably reduced, with respect to the parts preparing work, it is possible to extremely efficiently carry out the parts preparing work for the assembly parts supplied to the work in comparison with the conventional one, and the operation mistake can be reduced. Further, it is possible to detect the state in which the parts are picked up from each of the receiving portions of the parts shelves in the working station, and the state in which the parts are received in the set containers, and it is possible to inform the worker of the state in which at least any one of them is different from the working instruction information, at a time when the state is detected. Therefore, it is possible to prevent the operation mistake from being generated in the parts preparing work.

In the parts supplying system having the constitution mentioned above, it is preferable that the parts supplying system is provided with an working finish instructing device which is operated after the operation of receiving the assembly parts in the set container is finished, the working finish instructing device is set such as to be capable of transmitting an working finish signal to the informing device, and the informing device informs the worker of the case that the working finish signal is received in a state in which the receiving work of the assembly parts is not finished after the display is carried out by the display control device.

In this case, with respect to the operation of picking up the parts and inputting the parts in the set container in the parts preparing work, not only the mistake can be prevented from being generated, but also the operation itself can be prevented from being neglected.

Further, in the parts supplying system having this constitution, it is preferable that the working finish instructing device is operated after finishing the operation of putting the assembly parts in the set container with respect to each of kinds of the assembly parts.

In this case, it is possible to more carefully prevent a confirmation of the finish of the parts preparing work from being neglected and it is possible to prevent the operation itself from being neglected, in each of the kinds of the assembly parts.

Furthermore, in the parts supplying system having the constitution mentioned above, it is more preferable that the parts extraction detecting device and/or the parts receiving detecting device is provided with an optical sensor.

In this case, since the optical sensor having a high detecting performance and a good availability is provided, it is possible to easily and securely detect the state in which the parts are picked up from each of the receiving portions of the parts shelves in the working station, and the state in which the parts are received in the set container.

Further, a parts supplying system of an assembling production line in accordance with the other aspect of the present invention is on the premise of a parts supplying system of an assembling production line which assembles different kinds or types of works in the same line. There is provided a parts supplying system of an assembling production line capable of assembling different types of works in the same line, comprising:

a host computer outputting a production management information including a production order information for a plurality of works;

a working instruction device for taking in a part of the production management information as an antecedent information coming before an actual parts preparing work, and generating a working instruction information including an assembly parts information relating to a kind and a number of the assembly parts to be assembled in the type of work, in each of the types of the works included in this intake production management information;

a plurality of set containers receiving a desired kind and number of assembly parts to be assembled in one work as one set of assembly parts set;

a parts setting area having a working station provided with parts shelves for receiving the assembly parts therein by the kinds, and inputting the assembly parts set for the corresponding type of work to each of the set containers, on the basis of the working instruction information;

a parts recording medium which is held in the received portion of the assembly parts at a time of putting the assembly parts in the parts shelves, and records parts information of the assembly parts;

a recording medium holding device which is provided in the set container and is capable of holding the parts recording medium taken out from the parts shelves;

a parts information reading device for reading the parts information recorded in the parts recording medium;

a parts information collating device for collating the parts information read by the parts information reading device and the assembly parts information corresponding to the set container on the basis of the working instruction information; and a collated result informing device for informing of a collated result by the parts information collating device.

In accordance with this constitution, the required kind and number of assembly parts to be assembled in one work are received as one set of assembly parts set in the set container, and are supplied to the works in the assembling production line. Therefore, a load relating to an incidental operation such as a parts selecting operation, a parts extraction operation and the like can be remarkably reduced with respect to the parts assembling operation in the work, the parts assembling operation can be efficiently carried out in comparison with the conventional one, and the operation mistake can be reduced.

Further, since it is not necessary that a lot of parts shelves are provided along the assembling production line, a large repair operation or the like is not required even in the case that the organization of the assembling operation in the assembling production line is changed, and it is possible to remarkably increase a flexibility of changing the line.

Further, since it is possible to carry out the parts preparing work separately from the parts assembling operation in the work, it is possible to increase a flexibility with respect to a working time, for example, the parts preparing work is intensively carried out in one time period, whereby a lot of time is generated and is used for the other works.

Still further, it is possible to collate the parts information of the assembly parts received in the parts shelves recorded by the parts recording medium and the assembly parts information corresponding to the set container on the basis of the working instruction information, and it is possible to inform of the collated result. Therefore, it is possible to prevent the erroneous parts from being set in the parts set container even when the set mistake is not generated by the worker, and prevent the parts set container to which the erroneous parts are set from being input to the assembling production line. Further, in the case that the erroneous parts are received in the receiving portion of the parts shelves, due to the error at a time of putting the assembly parts in the parts shelves, it is possible to securely detect the error mentioned above so as to take a corrective action. In particular, it is possible to do away with an unnecessary parts extraction operation as possible, by carrying out the collation mentioned above at a time of first taking out the parts after receiving the assembly parts in the parts shelves.

In the parts supplying system having the constitution mentioned above, it is preferable that the parts supplying system is further provided with a recording medium supplying device for picking up the parts recording medium held by the recording medium holding device of the set container from the recording medium holding device so as to automatically supply to the parts information reading device.

In this case, it is possible to save labor for picking up the parts recording medium from the recording medium holding device of the set container and supplying the parts recording medium to the parts information reading device, and it is possible to reduce a load of the worker in the parts preparing work.

Still further, in the parts supplying system having the constitution mentioned above, more preferably, the working instruction device takes in the production management information corresponding to a preset number of works as an antecedent information coming before an actual parts preparing work, extracts the same type of works included in this intake production management information as the same type lot in a unit of a predetermined number so as to sort in an order of a parts preparing work, generates a working instruction information including a parts preparing work order of the same type lot, the predetermined number and an assembly parts information relating to a kind and a number of the assembly parts to be assembled in the type of work each of the types, the assembly parts set for the corresponding type of work to each of the set containers are input in the order of the parts preparing works by a unit of the same type lot, on the basis of the working instruction information, in the parts setting area, and is provided with a set container inputting device which returns each of the set containers from the parts setting area in an order of the type in accordance with the production order in the assembling production line so as to input to the assembling production line.

In this case, the same type of works included to the production management information are extracted as the same type lot by the unit of the predetermined number from the production order of the works in the assembling production line so as to be arranged in the order of the parts preparing works. Therefore, it is sufficient to receive the assembly parts in each of the set containers by the unit of the predetermined number of same type lot in the order of the parts preparing works, in the parts setting area, even if the production order of the works in the assembling production line is the irregular order which is not arranged per types. Accordingly, with respect to the parts preparing work, the arranging operation can be carried out by the lot unit, a operation load relating to judgement of parts selection is reduced, the parts preparing work for the assembly parts supplied to the work can be extremely efficiently carried out in comparison with the conventional one, and the operation mistake can be reduced.

Further, since each of the set containers receiving the assembly parts sets is returned to the order of the types in accordance with the production order in the assembling production line so as to be supplied to the works in the line, a load relating to an incidental operation such as a parts selecting operation, a parts extraction operation and the like can be remarkably reduced with respect to the parts assembling operation in the work, the parts assembling operation can be efficiently carried out in comparison with the conventional one, and the operation mistake can be reduced.

Still further, in the parts supplying system having the constitution mentioned above, it is preferable that the set container input mechanism is provided with a set container temporarily storing device for temporarily storing each of the set containers receiving the assembly parts set respectively.

In this case, it is possible to temporarily store the set containers by the unit of the same machine type lot in the order of the parts preparing work, in the set container temporarily storing device, and it is possible to return to the order of the types in accordance with the production order in the assembling production line. Further, it is possible to temporarily store a lot of set containers in which the assembly parts are already received by intensively carrying out the parts preparing work in one time period, in the set container temporarily storing device. In particular, it is possible to easily increase a flexibility with respect to a working time by setting a capacity of the set container temporarily storing device (a storing capacity for the set containers) larger.

Still further, in the parts supplying system having the constitution mentioned above, it is preferable that a transfer route for transferring the set container together with the work in correspondence to the work flowing in the line is set in the assembling production line, and a set container temporarily extraction device for temporarily picking up the set container from the transfer route is provided in a part of the transfer route.

In this case, even if there is an area in which the set container can not be transferred approximately along the work exists in the way of the assembling production line, it is possible to deal effectively with the situation, with respect to such an area, by temporarily picking up the set container from the transfer route.

Further, a parts supplying method of an assembling production line in accordance with one aspect of the present invention is on the premise of a parts supplying method of an assembling production line in which different kinds or types of works may be assembled in the same line. There is provided a parts supplying method of an assembling production line capable of assembling different types of works in the same line, comprising:

a step of outputting a production management information including a production order information for a plurality of works form a host computer;

a step of taking in the production management information corresponding to a preset number of works as an antecedent information coming before an actual parts preparing work, extracting the same type of works included in this intake production management information as the same type lot in a unit of a predetermined number so as to sort in an order of a parts preparing work, and generating a working instruction information including a parts preparing work order of the same type lot, the predetermined number and an assembly parts information relating to a kind and a number of the assembly parts to be assembled in the type of work each of the types;

a step of preparing a plurality of set containers receiving a desired kind and number of assembly parts to be assembled in one work as one set of assembly parts set, and inputting the assembly parts set for the corresponding type of work to each of the set containers in the order of the parts preparing works by a unit of the same type lot, on the basis of the working instruction information, in a operation area provided with parts shelves for receiving the assembly parts therein by the kinds; and a step of returning each of the set containers to which each of the assembly parts sets is input in an order of the type in accordance with the production order in the assembling production line so as to input to the assembling production line.

In accordance with this method, since the same type of works included to the production management information are extracted as the same type lot by the unit of the predetermined number from the production order of the works in the assembling production line so as to be arranged in the order of the parts preparing works, it is sufficient to receive the assembly parts in each of the set containers by the unit of the predetermined number of same type lot in the order of the parts preparing works, in the parts setting area, even if the production order of the works in the assembling production line is the irregular order which is not arranged per types. Accordingly, with respect to the parts preparing work, the arranging operation can be carried out by the lot unit, a operation load relating to judgement of parts selection is reduced, the parts preparing work for the assembly parts supplied to the work can be extremely efficiently carried out in comparison with the conventional one, and the operation mistake can be reduced.

Further, since the desired number and number of assembly parts to be assembled in one work are received as one set of assembly parts set in the set container, and are returned to the order of the types in accordance with the production order in the assembling production line so as to be supplied to the works in the line, a load relating to an incidental operation such as a parts selecting operation, a parts extraction operation and the like can be remarkably reduced with respect to the parts assembling operation in the work, the parts assembling operation can be efficiently carried out in comparison with the conventional one, and the operation mistake can be reduced.

Further, since it is not necessary that a lot of parts shelves are provided along the assembling production line, a large repair operation or the like is not required even in the case that the organization of the assembling operation in the assembling production line is changed, and it is possible to remarkably increase a flexibility of changing the line.

Further, since it is possible to carry out the parts preparing work separately from the parts assembling operation in the work, it is possible to increase a flexibility with respect to a working time, for example, the parts preparing work is intensively carried out in one time period, whereby a lot of time is generated and is used for the other operations.

In the parts supplying method having the constitution mentioned above, it is preferable that each of the set containers is temporarily stored in a storing device, at a time of returning each of the set containers to the order of the types in accordance with the production order in the assembling production line so as to input to the assembling production line.

In this case, it is possible to temporarily store the set containers by the unit of the same machine type lot in the order of the parts preparing work, in the storing device, and it is possible to return to the order of the types in accordance with the production order in the assembling production line. Further, it is possible to temporarily store a lot of set containers in which the assembly parts are already received by intensively carrying out the parts preparing work in one time period, in the storing device. In particular, it is possible to easily increase a flexibility with respect to a working time by setting a capacity of the storing device (a storing capacity for the set container) larger.

Further, in the parts supplying method having the constitution mentioned above, it is preferable that a transfer route for transferring the set container together with the work in correspondence to the work flowing in the line is set in the assembling production line, and a set container temporarily extraction device for temporarily picking up the set container from the transfer route is provided in a part of the transfer route.

In this case, even in the case that an area in which the set container can not be transferred approximately along the work exists in the way of the assembling production line, such an area can be easily supported by temporarily picking up the set container from the transfer route.

Further, a parts supplying method of an assembling production line in accordance with another aspect of the present invention is on the premise of a parts supplying method of an assembling production line in which different kinds or types of works may be assembled in the same line. There is provided a parts supplying method of an assembling production line capable of assembling different types of works in the same line, comprising:

a step of outputting a production management information including a production order information for a plurality of works from a host computer;

a step of taking in a part of the production management information as an antecedent information coming before an actual parts preparing work, and generating a working instruction information including an assembly parts information relating to a kind and a number of the assembly parts to be assembled in the type of work, in each of the types of the works included in this intake production management information;

a step of preparing a plurality of set containers receiving a desired kind and number of assembly parts to be assembled in one work as one set of assembly parts set, and inputting the assembly parts set for the corresponding type of work to each of the set containers, in a parts setting area having a working station provided with parts shelves for receiving the assembly parts therein by the kinds;

a step of writing the assembly parts information corresponding to the set container on the basis of the working instruction information, with respect to a memory device provided in the set container, before inputting the assembly parts set to the set container;

a step of reading the assembly parts information stored in the memory device of the set container input to the working station;

a step of displaying an object set container to be operated and the receiving portion of the parts shelves for an parts to be received in the container, on the basis of the assembly parts information, at a time when the set containers are input to the working station;

a step of detecting a state in which the parts are picked up from each of the receiving portions of the parts shelves;

a step of detecting a state in which the parts are received in the set containers; and a step of informing a worker in the operation area of a state in which at least any one of the parts receive state and the parts extraction state is different from the working instruction information, at a time when the state is detected.

In accordance with this method, since the desired number and number of assembly parts to be assembled in one work are received as one set of assembly parts set in the set container, and are supplied to the works in the assembling production line, a load relating to an incidental operation such as a parts selecting operation, a parts extraction operation and the like can be remarkably reduced with respect to the parts assembling operation in the work, the parts assembling operation can be efficiently carried out in comparison with the conventional one, and the operation mistake can be reduced.

Further, since it is not necessary that a lot of parts shelves are provided along the assembling production line, a large repair operation or the like is not required even in the case that the organization of the assembling operation in the assembling production line is changed, and it is possible to remarkably increase a flexibility of changing the line.

Further, since it is possible to carry out the parts preparing work separately from the parts assembling operation in the work, it is possible to increase a flexibility with respect to a working time, for example, the parts preparing work is intensively carried out in one time period, whereby a lot of time is generated and is used for the other operations.

Still further, since the set container to be operated and the receiving portion of the parts shelve for the parts to be received in the container are displayed, on the basis of the assembly parts information, at a time when the set container is input to the working station in the parts setting area, a operation load relating to judgement of parts selection can be remarkably reduced, with respect to the parts preparing work, it is possible to extremely efficiently carry out the parts preparing work for the assembly parts supplied to the work in comparison with the conventional one, and the operation mistake can be reduced. Further, since it is possible to detect the state in which the parts are picked up from each of the receiving portions of the parts shelves in the working station, and the state in which the parts are received in the set containers, and it is possible to inform the worker of the state in which at least any one of them is different from the working instruction information, at a time when the state is detected, it is possible to prevent the operation mistake from being generated in the parts preparing work.

In the parts supplying method having the constitution mentioned above, it is preferable that the parts supplying system is provided with a working finish instructing device which is operated after the operation of receiving the assembly parts in the set container is finished, and the worker is informed of the matter that a working finish signal is received from the working finish instructing device in a state in which the receiving work of the assembly parts in the set container is not finished after the display of the set container to be operated and the receiving portion of the parts shelves for the parts to be received are displayed, in the case that such a matter is generated.

In this case, with respect to the work of picking up the parts and inputting the parts in the set container in the parts preparing work, not only the mistake can be prevented from being generated, but also the operation itself can be prevented from being neglected.

Further, in the parts supplying method having this constitution, it is preferable that the working finish instructing device is operated after finishing the operation of receiving the assembly parts in the set container with respect to each of kinds of the assembly parts.

In this case, it is possible to more carefully prevent a confirmation of the finish of the parts preparing work from being neglected and it is possible to prevent the operation itself from being neglected, in each of the kinds of the assembly parts.

Further, in the parts supplying system having the constitution mentioned above, it is more preferable that the parts extraction detecting device and/or the parts receiving detecting device is provided with an optical sensor.

In this case, since the optical sensor having a high detecting performance and a good availability is provided, it is possible to easily and securely detect the state in which the parts are picked up from each of the receiving portions of the parts shelves in the working station, and the state in which the parts are received in the set container.

Further, a parts supplying method of an assembling production line in accordance with the other aspect of the present invention is on the premise of a parts supplying method of an assembling production line in which different kinds or types of works may be assembled in the same line. There is provided a parts supplying method of an assembling production line capable of assembling different types of works in the same line, comprising:

a step of outputting a production management information including a production order information for a plurality of works from a host computer;

a step of taking in a part of the production management information as an antecedent information coming before an actual parts preparing work, and generating a working instruction information including an assembly parts information relating to a kind and a number of the assembly parts to be assembled in the type of work, in each of the types of the works included in this intake production management information;

a step of preparing a plurality of set containers receiving a desired kind and number of assembly parts to be assembled in one work as one set of assembly parts set, and inputting the assembly parts set for the corresponding type of work to each of the set containers, in a parts setting area having a working station provided with parts shelves for receiving the assembly parts therein by the kinds;

a step of making parts recording medium recording parts information of the assembly parts be held in the received portion of the assembly parts, at a time of receiving the assembly parts in the parts shelves;

a step of picking up the parts recording medium from the parts shelves at a time of picking up the assembly parts from the parts shelves so as to input to the container, and making the parts recording medium be held by a recording medium holding device which is provided in the set container;

a step of reading the parts information recorded in the parts recording medium by a parts information reading device;

a step of collating the parts information read by the parts information reading device and the assembly parts information corresponding to the set container on the basis of the working instruction information by a parts information collating device; and a step of informing of a collated result by the parts information collating device by a collated result informing device.

In accordance with this constitution, since the desired number and number of assembly parts to be assembled in one work are received as one set of assembly parts set in the set container, and are supplied to the works in the assembling production line, a load relating to an incidental operation such as a parts selecting operation, a parts extraction operation and the like can be remarkably reduced with respect to the parts assembling operation in the work, the parts assembling operation can be efficiently carried out in comparison with the conventional one, and the operation mistake can be reduced Further, since it is not necessary that a lot of parts shelves are provided along the assembling production line, a large repair operation or the like is not required even in the case that the organization of the assembling operation in the assembling production line is changed, and it is possible to remarkably increase a flexibility of changing the line.

Further, since it is possible to carry out the parts preparing work separately from the parts assembling operation in the work, it is possible to increase a flexibility with respect to a working time, for example, the parts preparing work is intensively carried out in one time period, whereby a lot of time is generated and is used for the other operations.

Still further, since it is possible to collate the parts recording medium recording the parts information of the assembly parts received in the parts shelves and the assembly parts information corresponding to the set container on the basis of the working instruction information, and it is possible to inform of the collated result, it is possible to prevent the erroneous parts from being set in the parts set container even when the set mistake is not generated by the worker, and prevent the parts set container to which the erroneous parts are set from being input to the assembling production line. Further, in the case that the erroneous parts are received in the receiving portion of the parts shelves, it is possible to securely detect the error mentioned above so as to take a corrective action. In particular, it is possible to do away with an unnecessary parts extraction operation by carrying out the collation mentioned above at a time of first taking out the parts after receiving the assembly parts in the parts shelves.

In the parts supplying system having the constitution mentioned above, it is preferable that the parts supplying method further comprises a step of automatically supplying the parts recording medium by a recording medium supplying device, at a time of picking up the parts recording medium held by the recording medium holding device of the set container from the recording medium holding device so as to automatically supply to the parts information reading device.

In this case, it is possible to save labor for picking up the parts recording medium from the recording medium holding device of the set container and supplying the parts recording medium to the parts information reading device, and it is possible to reduce a load of the worker in the parts preparing work.

Still further, in the parts supplying method having the constitution mentioned above, more preferably, the step of generating the working instruction information comprises a step of taking in the production management information corresponding to a preset number of works as an antecedent information coming before an actual parts preparing work, extracting the same type of works included in this intake production management information as the same type lot in a unit of a predetermined number so as to sort in an order of a parts preparing work, and generating a working instruction information including a parts preparing work order of the same type lot, the predetermined number and an assembly parts information relating to a kind and a number of the assembly parts to be assembled in the type of work each of the types, and the step of inputting the assembly parts set to each of the set containers comprises a step of inputting the assembly parts set for the corresponding type of work to each of the set containers in the order of the parts preparing works by a unit of the same type lot, on the basis of the working instruction information, and returning each of the set containers each of which the assembly parts set is input to, in an order of the type in accordance with the production order in the assembling production line so as to input to the assembling production line.

In this case, since the same type of works included to the production management information are extracted as the same type lot by the unit of the predetermined number from the production order of the works in the assembling production line so as to be arranged in the order of the parts preparing works, it is sufficient to receive the assembly parts in each of the set containers by the unit of the predetermined number of same type lot in the order of the parts preparing works, in the parts setting area, even if the production order of the works in the assembling production line is the irregular order which is not arranged per types. Accordingly, with respect to the parts preparing work, the arranging operation can be carried out by the lot unit, a operation load relating to judgement of parts selection is reduced, the parts preparing work for the assembly parts supplied to the work can be extremely efficiently carried out in comparison with the conventional one, and the operation mistake can be reduced.

Further, since each of the set containers receiving the assembly parts sets is returned to the order of the types in accordance with the production order in the assembling production line so as to be supplied to the works in the line, a load relating to an incidental operation such as a parts selecting operation, a parts extraction operation and the like can be remarkably reduced with respect to the parts assembling operation in the work, the parts assembling operation can be efficiently carried out in comparison with the conventional one, and the operation mistake can be reduced.

Still further, in the parts supplying method having the constitution mentioned above, it is preferable that each of the set containers is temporarily stored in a storing device, at a time of returning each of the set containers to the order of the types in accordance with the production order in the assembling production line so as to input to the assembling production line.

In this case, it is possible to temporarily store the set containers by the unit of the same machine type lot in the order of the parts preparing work, in the storing device, and it is possible to return to the order of the types in accordance with the production order in the assembling production line. Further, it is possible to temporarily store a lot of set containers in which the assembly parts are already received by intensively carrying out the parts preparing work in one time period, in the storing device. In particular, it is possible to easily increase a flexibility with respect to a working time by setting a capacity of the storing device (a storing capacity for the set container) larger.

Still further, in the parts supplying method having the constitution mentioned above, it is preferable that a transfer route for transferring the set container together with the work in correspondence to the work flowing in the line is set in the assembling production line, and a set container temporarily extraction device for temporarily picking up the set container from the transfer route is provided in a part of the transfer route.

In this case, even in the case that an area in which the set container can not be transferred approximately along the work exists in the way of the assembling production line,

DESCRIPTION OF THE PREFERRED EMBODIMENTS

A description will be in detail given below of an preferred embodiment in accordance with the present invention by exemplifying a case that the present invention is applied to a parts supply, for example, to an engine assembly line for a motor vehicle, with reference to the accompanying drawings.

In this case, the engine assembly line mentioned above is constituted as a so-called mixed assembly line in which different kinds (types) of engines (works) are assembled in the same line.

Figure 1:
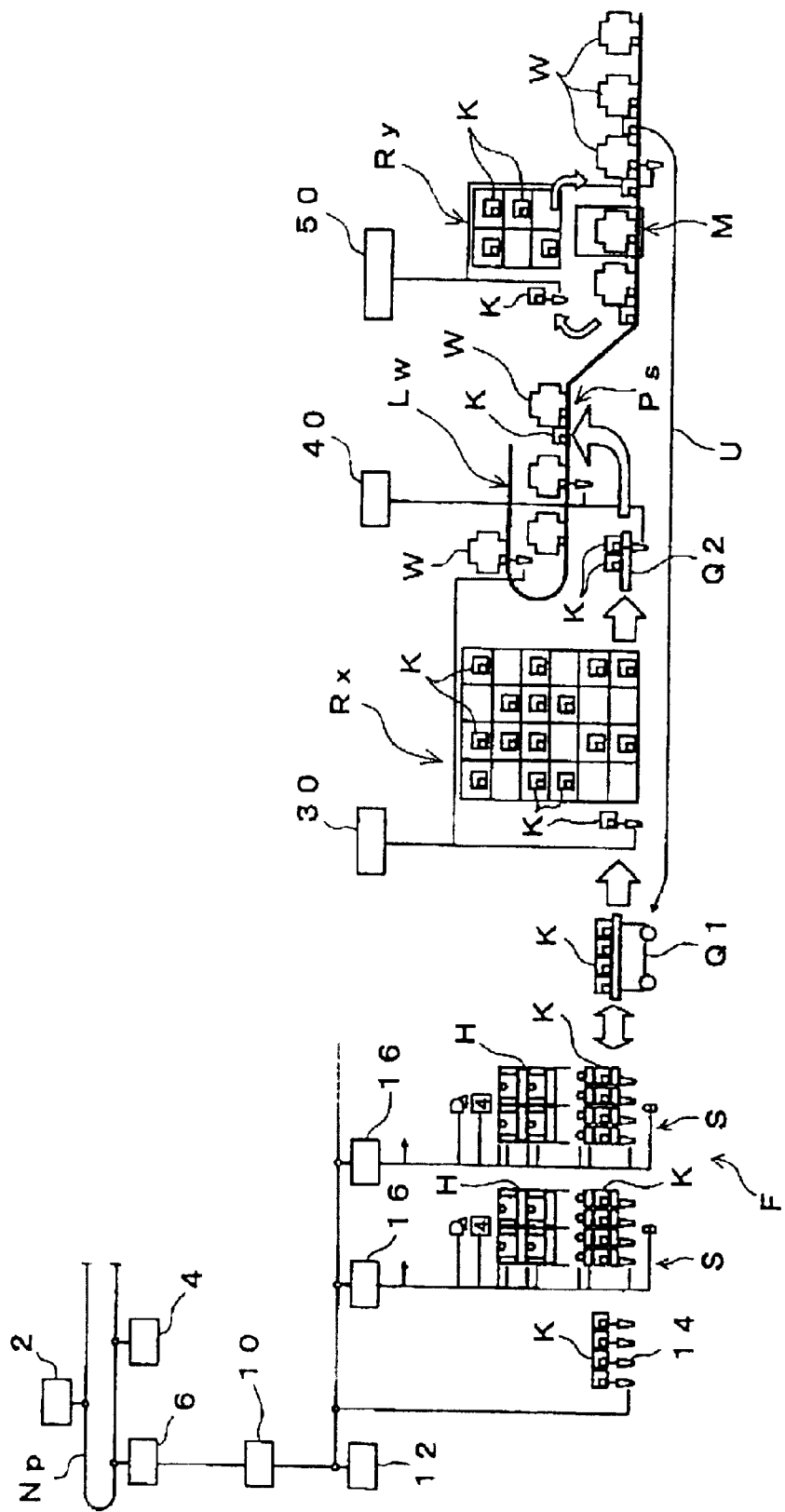
FIG. 1 is an explanatory drawing schematically showing a whole constitution of an engine assembly line provided with a parts supplying system in accordance with an embodiment of the present invention.
Figure 2:
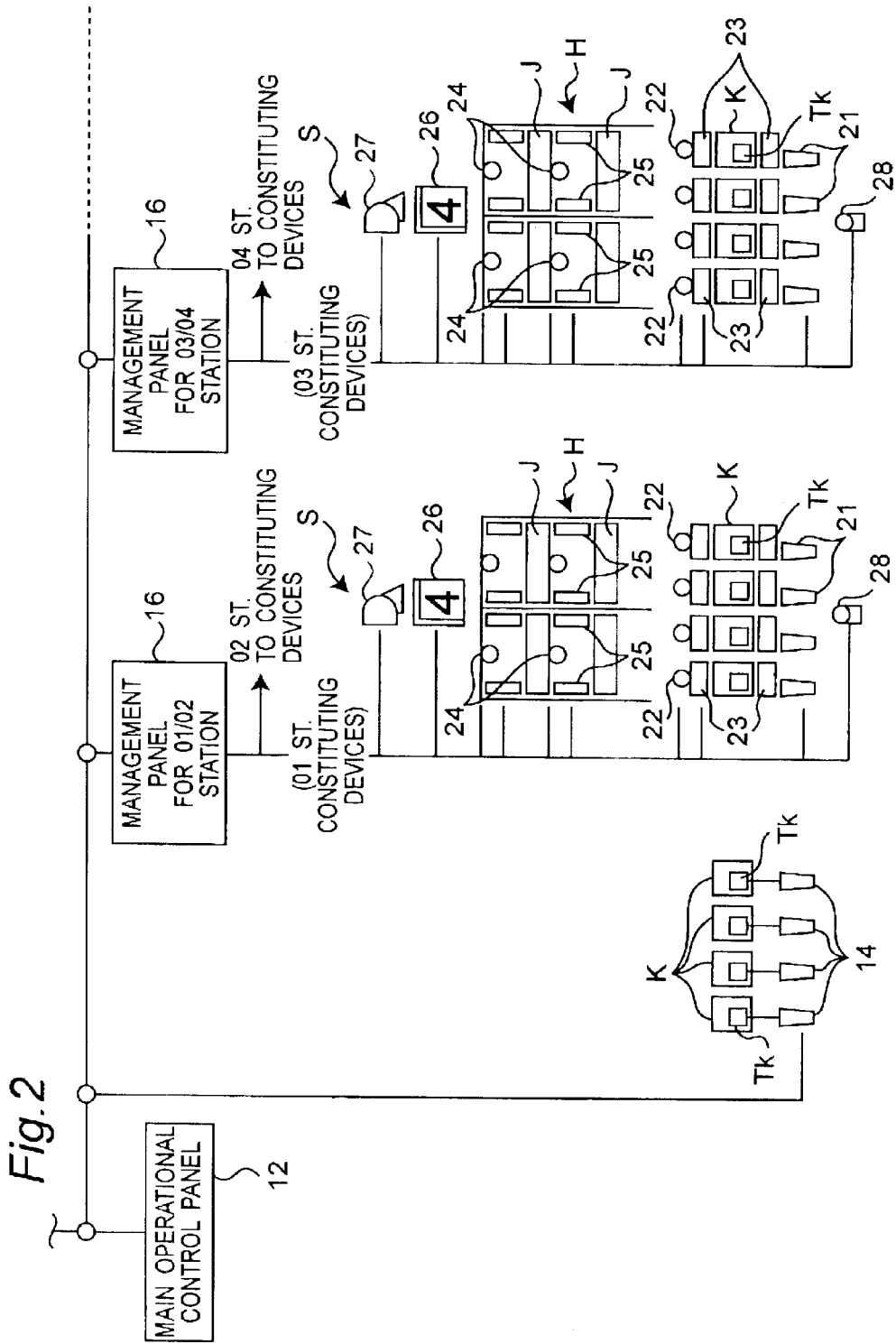
FIG. 2 is an explanatory drawing schematically showing a parts setting area in the parts supplying system in an enlarged manner.
Figure 3:
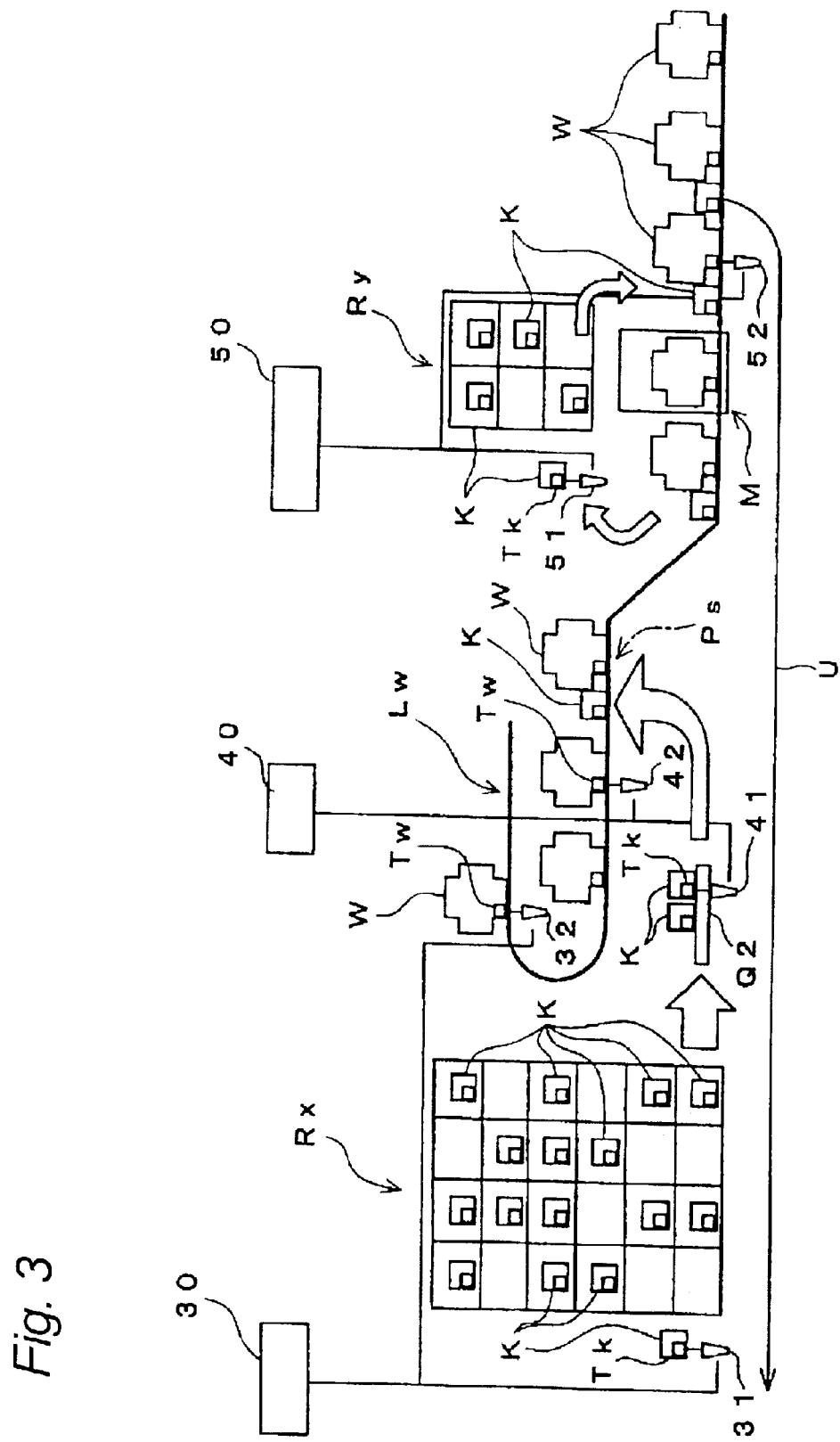
FIG. 3 is an explanatory drawing schematically showing a replacement buffer, an engine assembly line and a temporarily extraction buffer in the parts supplying system in an enlarged manner.
Figure 4:
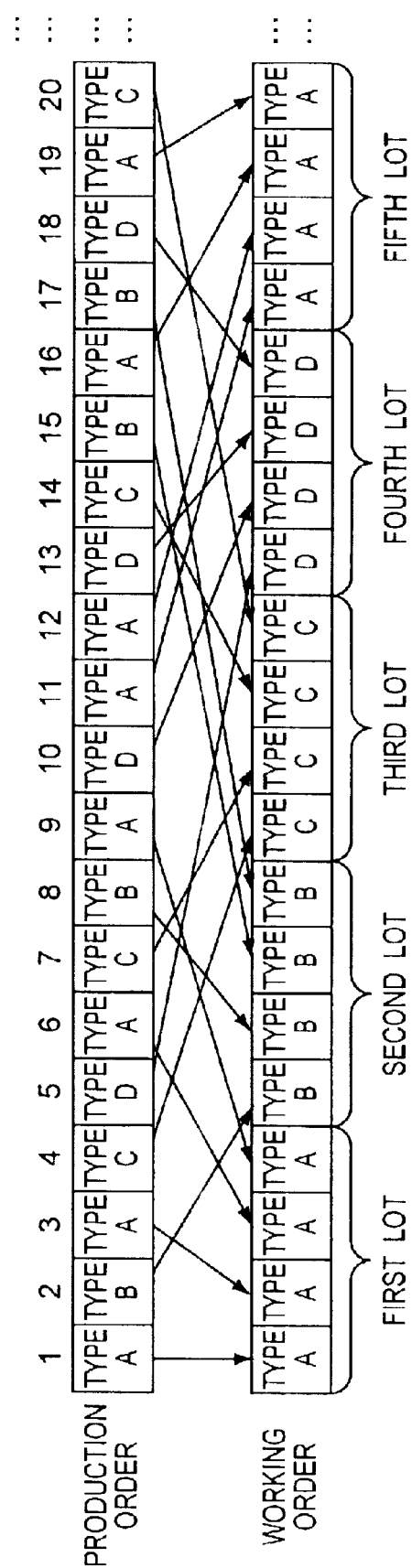
FIG. 4 is an explanatory drawing schematically showing a production order information of a host computer and a parts preparing work order obtained by rearranging the production order.

FIG. 1 is an explanatory drawing schematically showing a whole constitution of an engine assembly line provided with a parts supplying system in accordance with the present embodiment, FIG. 2 is an explanatory drawing schematically showing a parts setting area in the parts supplying system in an enlarged manner, FIG. 3 is an explanatory drawing schematically showing a replacement buffer, a production line (an engine assembly line) and a temporarily delivery buffer in the parts supplying system in an enlarged manner, and FIG. 4 is an explanatory drawing schematically showing a production order information of a host computer mentioned below and a parts preparing work order obtained by rearranging the production order information.

As shown in FIG. 1, in the parts supplying system in accordance with the present embodiment, there is provided a host computer 2 which generates a production management information relating to an assembly of works W (engines) to be assembled and produced in an engine assembly line Lw, and sequentially outputs the production management information to a parts supply network Np. It is to be noted that the host computer 2 may be provided in any of an external portion and an internal portion of an engine assembly factory.

In the production management information, with respect to a lot of works W, there is included a production order information for defining an order by which they should be assembled. In this case, the production order is determined, for example, in accordance with an early delivery time, or in accordance with an early order entry in the case that the delivery time is the same. Accordingly, as shown by "production order" in FIG. 4, in view of types of works, the types are arranged in accordance with an irregular order which is not arranged per types. That is, no regularity exists between the order and the types of works.

Further, more preferably, the production management information mentioned above includes an assembly parts information which specifies kinds and a number of the assembly parts to be assembled to the work W of the type, per types of the works W included therein.

A working instruction server 6 is connected to the parts supply network Np. This working instruction server 6 receives an optionally preset number of production management information supplied to the parts supply network Np in an antecedent manner. That is, as described below, with respect to an optional set number (for example, 100) of works antecedent to the works W which is actually applied a parts preparing work for the assembly parts in a parts setting area F, the production management information is taken in as the antecedent information from the parts supply network Np.

At this time, as shown by "production order" in FIG. 4, for example, a lot of works W including four types comprising types A, B, C and D are arranged in the irregular order which is not arranged per types.

Then, a small lot of the same type is formed by rearranging the same type of works W included within the optional set number of antecedent information in accordance with a unit of an optional predetermined number, by the working instruction server 6. That is, as shown by the "working order" in FIG. 4, for example, a large number of works W including four types comprising the types A, B, C and D are arranged in units of small lot having four parts per the same types, and are rearranged, for example, in an order or the type A (a first lot), the type B (a second lot), the type C (a third lot), the type D (a fourth lot), the type A (a fifth lot), and the like.

As mentioned above, with respect to the works W within the abovementioned antecedent information, the small lot of the same type in units of the predetermined number is extracted, and the small lots of the same types are rearranged in the order of the parts preparing work.

The "predetermined number" constituting the same type lot mentioned above is set to about four or less, in the present embodiment, for example, taking into consideration a working efficiency in the parts setting area F or the like, however, can be accordingly changed in correspondence to a condition such as a operation processing capacity in the parts setting area F. For example, in the case that the operation processing amount in the parts setting area F is secured sufficiently high, the "predetermined number" constituting the lot may be set more.

Further, a basic unit computer 4 is connected to the parts supply network Np. In the basic unit computer 4, an allocation of the assembly parts to be assembled in the work W of the type per the types A to D mentioned above is carried out on the basis of the assembly parts information included in the above-mentioned production management information. That is, the set of the assembly parts group to be received in a parts set container K mentioned below is defined per the types A to D, on the basis of each of parts codes or the like. This parts set container K device a container which receives a desired kind and number of assembly parts to be assembled to one work as one pair of assembly parts set.

Further, in the basic unit computer 4, there is carried out an allocation of the assembly parts to each of shelf frontages between parts shelves H (mentioned below) in the parts setting area F. That is, the assembly parts received in each of the shelve spaces are defined, whereby parts boxes J (refer to FIG. 2) received in each of the shelf frontages are determined.

The basic unit computer 4 outputs information relating to the allocation of the assembly parts sets per the types of works and the allocation of the assembly parts to each of the shelf frontages as mentioned above, to the parts supply network Np.

The working instruction server 6 mentioned above takes in the production management information including the production order information output from the host computer 2 as mentioned above as an antecedent information, receives each of the allocation information output from the basic unit computer 4, and generates a working instruction information including a parts preparing work order of the same type lot, the predetermined number constituting each of the same type lot, and an assembly parts information relating to the kind and the number of the assembly parts to be assembled to the work of the type per the types, with respect to the work W included in the antecedent information.

Then, the working instruction information is delivered to an apparatus controller 10 in the parts setting area F. The apparatus controller 10 is constituted such as to control the apparatus within the parts setting area F, and a main portion thereof is constituted, for example, by a microcomputer. The above-mentioned working instruction information is controlled by the apparatus controller 10.

In this case, the constitution may be made such that a memory apparatus is provided in the basic unit computer 4 or the working instruction server 6, the assembly parts information relating to the kind and the number of the assembly parts to be assembled to the work of the type per the types is previously stored in the memory apparatus, and this information is accordingly read out and used.

A main operational control panel 12 and a lot of station management panels 16 are additionally provided in the apparatus controller 10. For example, a plurality of (for example, twenty in the present embodiment) setting work stations S are provided in the parts setting area F, the corresponding station management panel 16 is allocated to each of the setting work stations S. In accordance with the present embodiment, for example, the constitution is made such that one station management panel 16 controls two setting work stations S.

The parts shelves H receiving the assembly parts to be assembled to the work W are placed in each of the setting work stations S. The parts shelf H is provided with a plurality of (four in the embodiment shown in FIGS. 1 and 2) shelf frontages receiving many kinds of assembly parts per the kinds.

As mentioned above, the allocation of the assembly parts to each of the shelf frontages is carried out by the basic unit computer 4, and the parts box J (refer to FIG. 2) receiving a predetermined assembly parts in correspondence to this allocation is stored in a predetermined shelf frontage.

In the parts setting area F mentioned above, there are prepared a lot of parts set containers K which receives a desired kind and number of assembly parts to be assembled in one work W as one set of assembly parts set. And, in this parts setting area F, the assembly parts set for the predetermined type is received in each of the parts set containers K.

In each of the parts set containers K, there is additionally provided an ID tag Tk (refer to FIG. 2) corresponding to a kind of identification tag, in which information data (that is, assembly parts information data) relating to the kind and the number of the assembly parts to be received within the container K can be written and stored and the data can be read out.

An ID writer 14 corresponding to a writing device for writing the assembly parts information to be received in the container K on the ID tag Tk of each of the parts set containers K is connected to the apparatus controller 10, whereby it is possible to write the assembly parts information on the ID tag Tk of the parts set container K, on the basis of the assembly parts information included in the working instruction information received from the apparatus controller 10. And, before the assembly parts set is input to and receive in the parts set container K in the parts setting area F, the writing of the assembly parts information on the ID tag Tk is sequentially carried out.

The parts set containers K are sequentially supplied in units of four containers constituting the same type lot mentioned above to each of the setting work stations S in the parts setting area F. Further, the assembly parts set for the corresponding type of work is input and received within each of the parts set containers K, on the basis of the working instruction information, in units of the same type lot and in an order of parts preparing work.

In order to accurately and efficiently input the assembly parts set into the parts set container K, various kinds of devices which are controlled by the station management panels 16 are arranged in each of the setting work stations S.

That is, in each of the setting work stations S, ID readers 21 are arranged respectively near predetermined working positions of the parts set containers K input to the setting work stations S, and the assembly parts information stored in the ID tag Tk of the corresponding parts set container K is read out by the ID reader 21.

Further, a container lamp 22 corresponding to a display control device for displaying the object parts set container K subject to the receiving work of the assembly parts is arranged near the predetermined working position in each of the parts set containers K. The container lamp 22 blinks or lights on the basis of the assembly parts information and the parts preparing work order, whereby the set container K subject to the receiving work of the assembly parts is displayed.

Further, a container sensor 23, for example, constituted by an optical sensor is arranged near the predetermined working position in each of the parts set containers K, and it is detected by the container sensor 23 that the assembly parts is input to the set container K. In other words, the receiving state of the parts in the set container K is detected.

In this case, with respect to the container sensor 23 mentioned above, the structure may be made such that a plurality of optical sensors are placed, thereby detecting in detail whether or not each of the assembly parts to be received in the parts set container K is received in a designated portion.

On the other hand, in each of the shelf frontages of each of the parts shelves H in each of the setting work stations S, there is arranged a shelf frontage lamp 24 corresponding to a display control device for displaying the shelf frontage of the parts shelf for the object parts to be received in the object set container K subject to the receiving work of the assembly parts. This shelf frontage lamp 24 blinks or lights on the basis of the assembly parts information and the parts preparing work order mentioned above, whereby the object shelf frontage subject to the work of taking the assembly parts, that is, the self frontage from which the assembly parts should be picked up, is displayed.

Further, a shelf frontage sensor 25, for example, constituted by an optical sensor is arranged in each of the shelf frontages of each of the parts shelves H mentioned above, and it is detected by the shelf frontage sensor 25 that the extraction operation of the assembly parts from the parts box J in the shelf frontage is carried out. In other words, a parts extraction state from each of the parts boxes J in the parts shelves H is detected.

In this case, both of the container sensor 23 and the shelf frontage sensor 25 mentioned above are constituted, for example, by an optical sensor provided with a light emitting portion and a light receiving portion, however, in place of this, the other known detecting device may be used as far as the insert of the parts into the container or the extraction of the parts from the receiving portion of the shelf frontage can be detected.

Further, a numerical quantity display device 26 is arranged in each of the setting work stations S. In accordance with the display of the numerical quantity display device 26, the worker can know a number of the parts set container K input to the setting work station S, that is, a work number (four in the present embodiment) constituting the same type lot, and can know a picking number of the assembly parts set.

Still further, an alarm buzzer 27 and a working finish button 28 are arranged in each of the setting work stations S. The working finish button 28 is operated by the worker after the parts receiving work in the parts set container K is finished per the kinds of the parts included in the assembly parts set to be input to the parts set container K in the setting work station S, and a working finish signal generated by this operation is input to the alarm buzzer 27, for example, via the station management panel 16

With respect to the object parts of inputting work, in the case that, after the order of the parts preparing work comes and the container lamp 22 and the shelf frontage lamp 24 start blinking, the worker pushes the working finish button 28 and the working finish signal is output in a state in which the inputting works of the object parts to the parts set container K is not finished by the worker, the alarm buzzer 27 is operated and an alarm sound is generated, so that a matter that the input work of the object parts is not finished, that is, "set neglection" is informed to the worker. The alarm buzzer 27 can be manually reset, and the worker carries out a necessary inputting operation or a checking operation after resetting the alarm buzzer 27.

Further, in the case that the container sensor 23 of the parts set container K which is not correspond to the object container of receiving parts and in which the container lamp 22 does not blinking detects the inputting operation of the parts, and the shelf frontage sensor 25 of the shelf frontage which is not correspond to the object shelf frontage of extracting parts and in which the shelf frontage lamp 24 does not blinking detects the picking (extraction) operation of the parts, the alarm buzzer 27 is operated and the alarm sound is generated, in both cases, so that a matter that the parts inputting operation and extraction operation is error is informed to the worker. That is, the structure is made such as to inform for the worker in the setting work station S, when at least one of the container sensor 23 corresponding to the parts receiving detecting device and the shelf frontage sensor 25 corresponding to the parts extraction detecting device detects a state which is different from the working instruction information.

As mentioned above, when the set container K is input to the setting work station S in the parts setting area F, the object set container K to which parts are input and the receiving portion of the parts shelf H for the object parts to be received in the container K are displayed on the basis of the assembly parts information. Accordingly, it is possible to remarkably reduce the operation load in connection with the judgement of the parts selection, with respect to the parts preparing work, it is possible to extremely effectively carry out the parts preparing work for the assembly parts supplied to the work W in comparison with the conventional method, and it is possible to reduce the operation mistake. Further, when it is detected that the parts extraction state from each of the receiving portions in the parts shelves H in the setting work station S, and the parts receiving state in the set container K, and the different state from the working instruction information is detected in at least any one of them, the state is informed to the worker in the setting work station S, so that it is possible to prevent the operation mistake from being generated in the parts preparing work.

Further, there is provided a working finish button 28 which is operated after finishing the work for receiving the assembly parts in the set container K, and the working finish button 28 is set such as to be capable of transmitting a working finish signal to the alarm buzzer 27. In the case that the working finish button 28 is pressed in spite of that the work for inputting the object parts to the set container K is not finished after the display by the container lamp 22 and the shelf frontage lamp 24 is carried out, and then the working finish signal is transmitted, the matter is informed the worker by the alarm buzzer 27, so that with respect to the work for picking up the parts and for inputting the parts to the set container in the parts preparing work, not only it is possible to prevent the mistake from being generated, but also it is possible to prevent the working itself from being forgot.

In particular, the working finish button 28 mentioned above is operated after the work for receiving the assembly parts in the parts set container K per the kinds is finished, whereby it is possible to more carefully prevent the working finish of the parts preparing work from being neglected to be checked and it is also possible to prevent the working itself from being neglected.

Further, the container sensor 23 and the shelf frontage sensor 25 are provided with the optical sensor. Since the optical sensor having a high detecting performance and a good availability is provided, it is possible to easily and securely detect the parts extraction state from each of the shelf frontages in the parts shelves H in the working station, and the parts received state in the parts set containers K.

Further, in this case, in particular, since the works W of the same type included in the production management information are extracted as the same type lot in units of a predetermined number from the production order of the works W in the assembling production line Lw, and are rearranged in the order of the parts preparing work. Therefore, the assembly parts may be put in each of the parts set containers K in the order of the parts preparing work in units of the same type lot having the predetermined number, in the parts setting area F, even if the production order of the works W in the assembling production line Lw is an irregular order which is not arranged per the types. Accordingly, with respect to the parts preparing work, it is possible to carry out an arranging operation in units of the lots, it is possible to reduce the operation load in accordance with the judgement of the parts selection, it is possible to extremely effectively carry out the parts preparing work of the assembly parts supplied to the work in comparison with the conventional one, it is possible to reduce the operation mistake.

Further, in particular, since it is possible to carry out the parts preparing work separately from the work for assembling the parts into the work, it is possible to increase a flexibility with respect to the work time, for example, it is possible to intensively carry out the part preparing operation for a preset period, thereby generating a lot of time so as to apply to the other works.

The setting work stations S, for example, a plurality of setting work stations structured in the manner mentioned above are provided in the parts setting area F, and each of the parts set containers K receiving a desired assembly parts set sequentially passing through the setting work stations S is supplied to a downstream side (a side close to the assembling production line Lw) by a transfer apparatus Q1, in the order that the parts preparing work is finished, that is, in units of the same type and in the order of the same preparing operation. In this case, as this transfer apparatus Q1, for example, an automatically guided vehicle (a so-called AGV) can be preferably used.

A replacement buffer Rx corresponding to a set container temporarily storing device which can temporarily store a plurality of set containers K receiving a required assembly parts sets is provided in a downstream side of the parts setting area F. This replacement buffer Rx is, as in detail shown in FIG. 3, structured as a kind of automatic stock room provided with a lot of cabinets, and more preferably, an ID reader 31 for reading the type information stored in the ID tag Tk in each of the parts set containers K is arranged in an inlet side thereof. This ID reader 31 is connected, so as to be capable of sending and receiving signals, to a replacement buffer management panel 30 for controlling an operation of the replacement buffer Rx.

The replacement buffer management panel 30 is structured, for example, by a microcomputer as a main portion thereof, and all of the parts set containers K each receiving the assembly parts set in the parts setting area F are temporarily stored within the replacement buffer Rx after reading the type information by the ID reader 31.

And, the stored parts set containers K are returned to the order of the types in accordance with the production order in the assembling production line Lw (refer to "production order" in FIG. 4), and are input to the assembling production line Lw.

That is, an ID reader 32 is connected to the replacement buffer management panel 30 so as to be capable of sending and receiving signals to each other. The ID reader 32 is to read the type information recorded in the ID tag Tw of the work W flowing through the assembling production line Lw. And, the order of the type of the work W actually flowing through the assembling production line Lw is obtained in accordance with the input signal from the ID reader 32. It is to be noted that the order of the types obtained by the input information from the ID reader 32 coincides with the production order information included in the production management information which the above-mentioned host computer 2 outputs.

The replacement buffer management panel 30 controls the operation of the replacement buffer Rx so that the desired type of parts set container K is delivered by the order in accordance with the input information from the ID reader 32, that is, by the order coinciding with the actual production order in the assembling production line Lw.

A transfer apparatus Q2 connected to the assembling production line Lw is arranged in an outlet side of the replacement buffer Rx. And, the parts set container K delivered by the order of the types corresponding to the production order, in synchronization with the actual production order in the assembling production line Lw as mentioned above is sequentially supplied to the assembling production line Lw by the transfer apparatus Q2. In this case, as the transfer apparatus Q2, for example, an automatic conveyor of roller type or the like may be preferably used.

More preferably, an ID reader 41 for reading the type information recorded in the ID tag Tk of each of the parts set containers K transferred by the transfer apparatus Q2 is arranged in the transfer apparatus Q2 mentioned above. This ID reader 41 is connected to a type collation management panel 40 collating the type of the work W in the assembling production line Lw and the type of the parts set containers K so as to be capable of sending and receiving signals.

Further, an ID reader 42 is arranged in a just upstream side of the parts supply point Ps in the assembling production line Lw. This ID reader 42 is to read the type information recorded in the ID tag Tw of the work W to which the parts set container K should be supplied at a parts supply point Ps in the assembling production line Lw at the next time. This ID reader 42 is connected to the type collation management panel 40 so as to be capable of sending and receiving signals.

And, it is possible to collate the type of the work W to which the parts set container K should be supplied at the parts supply point Ps at the next time, and the type of the supplied parts set container K, by collating the input signal from both of the ID reader 41 and 42. As a result of this collation, the parts set container K is supplied to the work W in a state in which coincidence between both types is confirmed. That is, the parts set container K is placed just beside the corresponding work W, on the assembling production line Lw so as to be applied to the parts assembling operation. In this case, the assembling production line Lw itself corresponds to a transfer route transferring the parts set container K together with the work W near the work W (in correspondence to the work W) flowing through the line Lw.

In the manner mentioned above, the required kind and number of assembly parts to be assembled into one work W are received as one set of assembly parts set in the parts set container K, and then are supplied to the work W in the assembling production line Lw. Further, the parts set container K is placed just beside the corresponding work W so as to be applied to the parts assembling operation. Therefore, a load in connection with the additional work such as the parts selection, the parts extraction and the like is remarkably reduced, with respect to the work for assembling the parts in the work. Accordingly, it is possible to effectively carry out the work for assembling the parts in the work W, and it is possible to reduce the operational mistake.

Further, in this case, since it is not necessary that a lot of parts shelves are provided along the assembling production line, a large repair operation or the like is not required even in the case of changing an organization of the assembling work in the assembling production line, and it is possible to remarkably increase a flexibility of line change.

Furthermore, since the replacement buffer Rx temporarily storing each of the set containers K each receiving the assembly parts set is provided at the downstream side of the parts setting area F, it is possible to temporarily store the parts set container K in the order of the parts preparing work in units of the same type lot, in the replacement buffer Rx mentioned above, thereafter returning the order of the parts set container to the order of the type in accordance with the production order in the assembling production line Lw.

Furthermore, it is possible to temporarily store a lot of parts set containers K already receiving the assembly parts obtained by intensively carrying out the parts preparing work in one time period, in this replacement buffer Rx. In particular, it is possible to easily increase a flexibility with respect to the working time, by setting a capacity of the replacement buffer Rx (a storing capacity of the set container) larger.

In the assembling production line Lw, there is provided, for example, a measuring station M for carrying out a leak test of an assembled engine W. An interference with the measuring apparatus is generated in the measuring station M in a state in which the parts set container K is placed just beside the work W, whereby a problem is generated in the test and the measurement. Accordingly, a temporarily extraction buffer Ry corresponding to a set container temporarily extraction device for temporarily picking up the parts set container K from the transfer route (that is, from the assembling production line Lw) is provided comparatively near the assembling production line Lw The temporarily extraction buffer Ry is structured as a kind of automatic stock room provided with a plurality of cabinets, and more preferably, an ID reader 51 is arranged in an inlet side thereof: The ID reader 51 is to read the type information recorded in the ID tag Tk in each of the parts set containers K, and is connected to a temporarily extraction buffer management panel 50 controlling an operation of the temporarily extraction buffer Ry so as to be capable of sending and receiving signals.

The temporarily extraction buffer management panel 50 is structured, for example, by a microcomputer as main portion, and all of the parts set containers K each coming to the point just upstream side of the measuring station M are temporarily stored within the temporarily extraction buffer Ry after reading the type information by the ID reader 51.

And, these stored parts set containers K are returned onto the assembling production line Lw just downstream side of the measuring station M in accordance with the original order.

Although a particular illustration is omitted, in the temporarily extraction buffer Ry, there is arranged a transfer apparatus (for example, an automatic conveyor of a roller type) which temporarily picks up the parts set container K from the assembling production line Lw in the upstream side of the measuring station M so as to store in the receiving shelf within the buffer Ry, and returns the parts set container K stored within the buffer Ry onto the assembling production line Lw just downstream side of the measuring station M.

Further, an ID reader 52 is arranged at the point just downstream side of the measuring station M. This ID reader 52 is to read the type information recorded in each of the ID tag Tw of the work W reaching the above-mentioned point (the point just downstream side of the measuring station M) after being measured and the ID tag Tk of the parts set container K returned onto the assembling production line Lw from the temporarily extraction buffer Ry. This ID reader 52 is connected to the temporarily extraction buffer management panel 50 so as to be capable of sending and receiving signals, and is structured such as to check whether or not both types coincide.

The parts set container K returned onto the assembling production line Lw from the temporarily extraction buffer Ry is returned as an empty container toward the parts setting area F as shown by an arrow U in FIGS. 1 and 3, in the case that all the assembly parts are used and the parts set container K becomes empty in the subsequent assembling step, and is reused in the parts setting area F.

As mentioned above, in the embodiment, the temporarily extraction buffer Ry temporarily extracting the parts set container K from a transfer route (the assembling production line) transferring the parts set container K is provided in a part of the transfer route. Therefore, it is possible to easily correspond to a case that an area (for example, the measuring station M) in which the parts set container K can not be transferred approximately along the work W is disposed in the way of the assembling production line Lw, by temporarily extracting the parts set container K from the transfer route, with respect to the above area.

A description will be given of an operation and a control of the parts supplying system constituted in the manner mentioned above with reference to flow charts in FIGS. 5 to 7.

Figure 5:
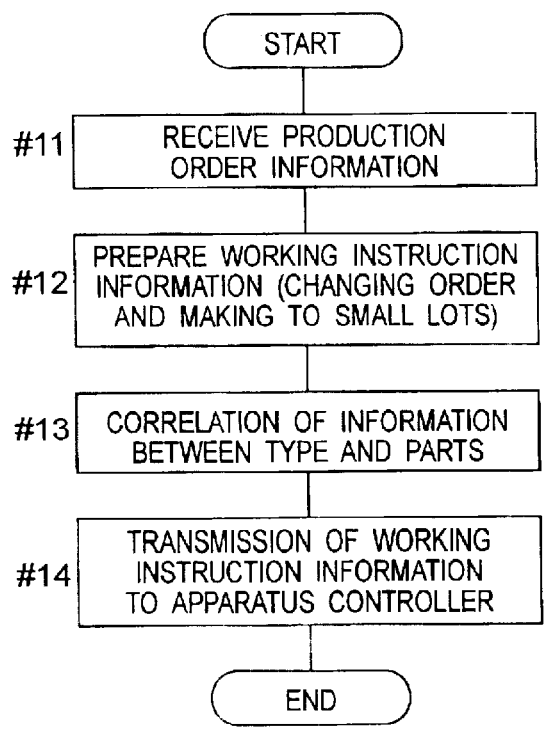
FIG. 5 is a part of a flow chart for describing an operation of the parts supplying system.

As shown in FIG. 5, when the system is started, first, the working instruction server 6 takes in the production management information including the production order information output from the host computer 2 as an antecedent information (step #11), and changes the order of the parts preparing work from the order of the production order information as well as separating the works W included in this antecedent information into small lots so as to constitute the small lots of the same type (step #12). Further, it receives each of the allocation information output from the basic unit computer 4 and allocates the assembly parts information relating to the kind and the number of the assembly parts to be assembled in the work of the type per the small lots of the same type (step #13).

That is, it generates the working instruction information including the order of the parts preparing work of the same type lot, the predetermined number constituting each of the same type lots, and the assembly parts information relating to the kind and the number of the assembly parts to be assembled into the work of the type per the types. Further, it transmits the working instruction information to the apparatus controller 10 in the parts setting area F (step #14). The working instruction information mentioned above is managed and controlled by the apparatus controller 10.

Figure 6:
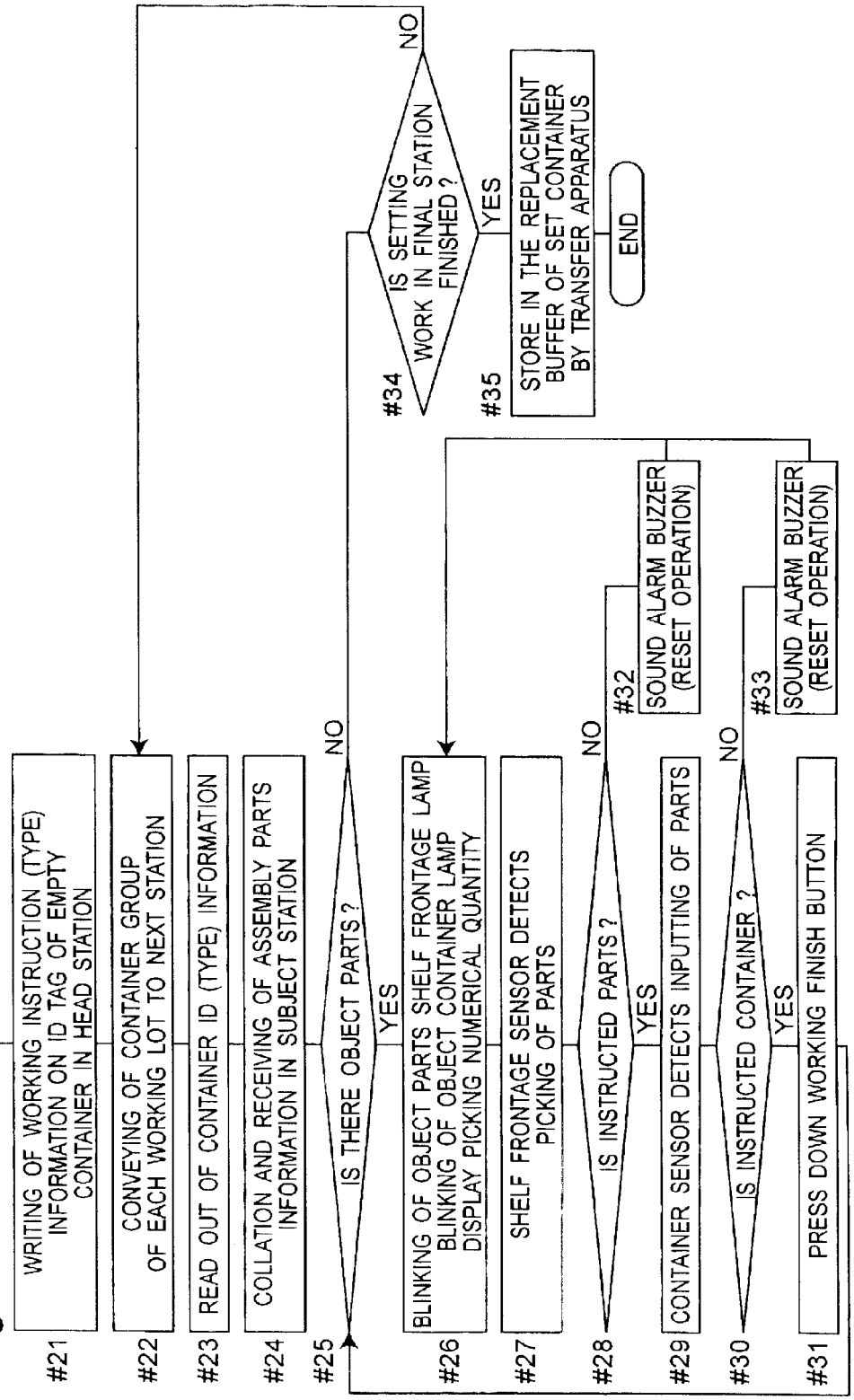
FIG. 6 is a part of the flow chart for describing the operation of the parts supplying system.

As shown in FIG. 6, in the parts setting area F, first, the working instruction information including the type information is written on the ID tag Tk of the empty parts set container K by using the ID writer 14, in a head station (step

21). And, the parts set container K is transferred to the setting work station S in the next step in units of the working lots of the same type (step #22). In the setting work station S to which the parts set container K is transferred, the working instruction information stored in the ID tag Tk of each of the parts set containers K is read by using the ID reader 21 (step #23).

The assembly parts information included in the working instruction information of the ID tag Tk, and the assembly parts information of the working instruction information transmitted to the station management panel 16 in the setting work station S are collated (step #24), and it is judged whether or not the object parts to be received in the parts set container K exists (step #25). In the case that a result of judgement is YES (the object parts exists), the shelf frontage lamp 24 of the object parts and the container lamp 22 of the object container K blink in step #26, and a numerical quantity of the parts to be picked up from the shelf frontage of the object parts so as to be input within the object container K is displayed on the numerical quantity display device 26.

Further, when the set worker picks up the parts from the parts shelf H, the shelf frontage sensor 25 detects the picking operation (step #27) Then, it is judged whether or not the picked parts correspond to the parts instructed by the blinking of the shelf frontage lamp 24 (that is, in accordance with the instruction of the working instruction information) (step #28).

In the case that the result of judgement is YES (equal to the instruction), the container sensor 23 detects the operation of inputting the parts to the parts set container K (step #29), and it is judged whether or not the parts input container K is the container K as instructed by the blinking of the container lamp 22 (that is, according to the instruction of the working instruction information) (step #30). In the case that the result of judgement is YES (according to the instruction), the set worker pushes down the working finish button 28 (step #31). Then, thereafter, each of the steps after the step #25 is repeatedly executed.

In the case that the result of judgement in the step #28 or the step "29 is NO (different from the instruction), the alarm buzzer 27 sounds (step #32 or step #33), and the matter that the picking operation or the parts inputting operation has an error is informed to the set worker. The worker informed of the matter resets the alarm buzzer 27, and thereafter, each of the steps after the step #26 is again executed.

In this case, although not being particularly shown in the flow chart in FIG. 6, in the case that the working finish button 28 is pushed down in a state in which the input of the object parts to the parts set container K is not finished after the container lamp 22 and the shelf frontage lamp 24 start blinking, the alarm buzzer 27 is operated so as to generate the alarm sound, and the matter that the inputting operation of the object parts is not finished is informed the worker, as mentioned above.

In the case that the parts to be set are lost after repeatedly executing each of the steps after the step #25 (step #25: NO), it is judged in step #34 whether or not the work in the final setting work station S in the parts setting area F is finished, and in the case that the result of judgement is NO, each of the steps after the step #22 is repeatedly executed.

On the other hand, in the case that the result of judgement in the step #34 is YES, the parts set container K receiving the assembly parts set is received is stored in the replacement buffer Rx by the transfer apparatus Q1.

Figure 7:
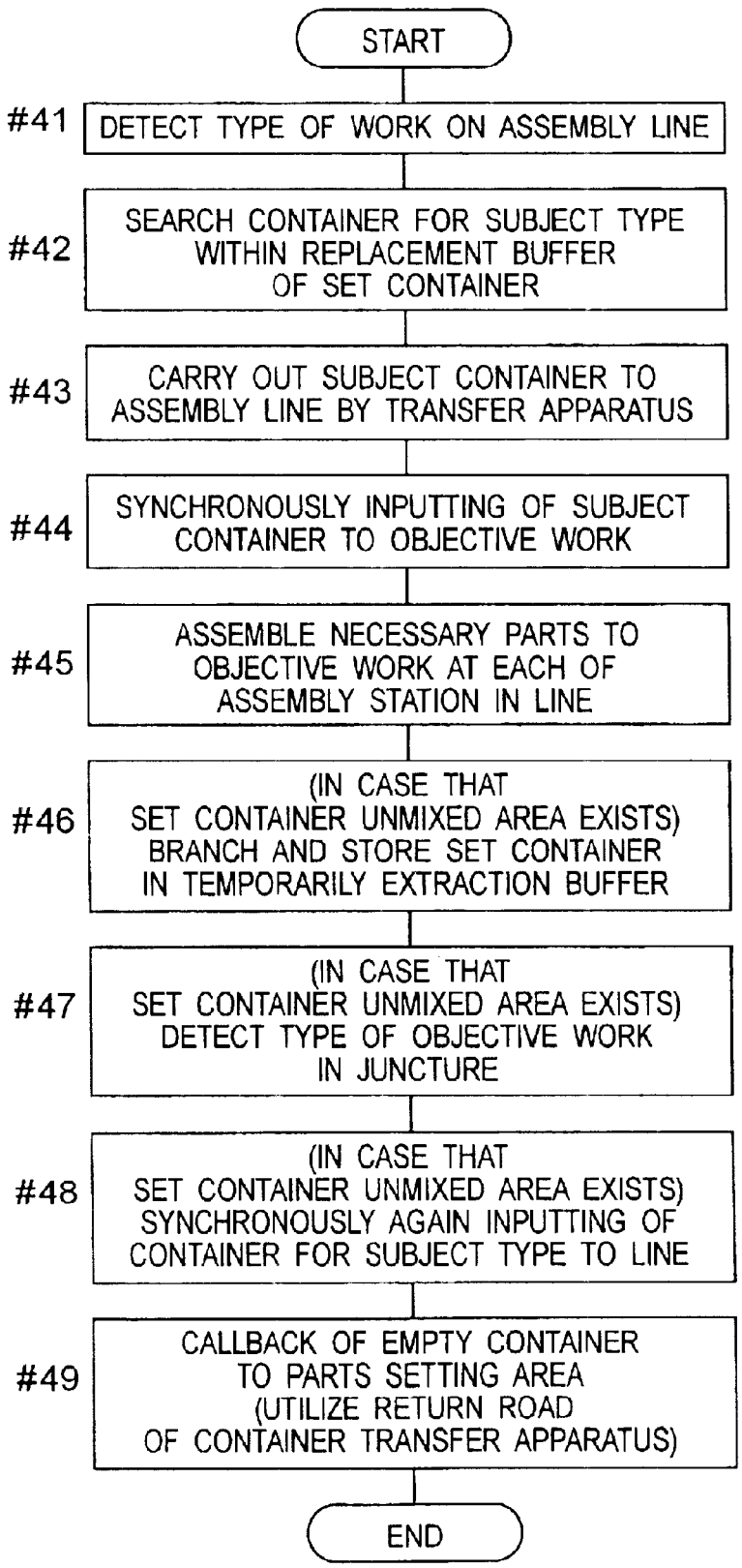
FIG. 7 is a part of the flow chart for describing the operation of the parts supplying system.

In the downstream side (in the side close to the assembling production line Lw) of the parts setting area F, as shown in FIG. 7, a type detection of the work W on the assembling production line Lw is carried out by the ID reader 32 (step #41), and a search of the parts set container K for the type is carried out within the replacement buffer Rx (step #42). Further, the parts set container K for the object type is delivered, and is carried out toward the assembling production line Lw by the transfer apparatus Q2 (step #43).

Further, in a state of collating the type on the basis of the reading information of the ID readers 41 and 42, the parts set container K is input so as to be synchronous with the work W on the assembling production line Lw (step #44).

Thereafter, the required assembly parts are assembled into the object work W in each of the parts assembling station of the assembling production line Lw (step #45). Further, in the case that there is a set container unmixed area (region) in which the parts set container K can not be transferred together with the corresponding work W, for example, the measuring station M mentioned above or the like, in the way of the assembling production line Lw, the parts set container K is temporarily picked up from the line Lw just upstream side of the area, and is branched from the line Lw so as to be stored in the temporarily extraction buffer Ry (step #46).

Next, the type of the corresponding work W is detected by the ID reader 52 in a juncture in the downstream side of the set container unmixed area (for example, the measuring station M) (step #47), and the parts set container K for the type is again input to the assembling production line Lw so as to be synchronous with the line Lw (step #48). Thereafter, the empty parts set container K in which all the parts of the assembly parts set are assembled into the corresponding work W is recovered toward the parts setting area F (step #49).

As described above, in accordance with the parts supplying system on the basis of the present embodiment, the same type of works W included to the production management information are extracted as the same type lot by the unit of the predetermined number from the production order of the works W in the assembling production line Lw so as to be arranged in the order of the parts preparing works. Therefore, it is sufficient for worker to put the assembly parts in each of the parts set containers K by the unit of the predetermined number of same type lot in the order of the parts preparing works, in the parts setting area F, even if the production order of the works W in the assembling production line Lw is the irregular order which is not arranged per types. Accordingly, with respect to the parts preparing work, the arranging operation can be carried out by the lot unit, and an operation load relating to judgement of parts selection is reduced. Further, the parts preparing work for the assembly parts supplied to the work W can be extremely efficiently carried out in comparison with the conventional system, and the operation mistake can be reduced.

Furthermore, according to the parts supplying system on the basis of the present embodiment, each of the parts set containers K receiving the assembly parts sets are returned to the order of the types in accordance with the production order in the assembling production line Lw so as to be supplied to the works W in the line Lw. Therefore, a load relating to an incidental operation such as a parts selecting operation, a parts extraction operation and the like can be remarkably reduced with respect to the parts assembling operation into the work W, and the parts assembling operation into the work W can be efficiently carried out in comparison with the conventional system, and the operation mistake can be reduced.

Next, a description will be given of another embodiment in accordance with the present invention. This another embodiment is base on the above-mentioned embodiment described in FIGS. 1 to 7, and is additionally has a function of detecting an error that erroneous parts are received in the receiving portion of the parts shelf due to a mistake, for example, at a time of putting the assembly parts in the parts shelf, or the like, in a stage of the parts preparing work.

It is to be noted that, in the following description, the same reference numerals are attached to elements having the same structures and the same operations as those in the case of the embodiment shown in FIGS. 1 to 7, and a further description will be omitted.

Figure 8:
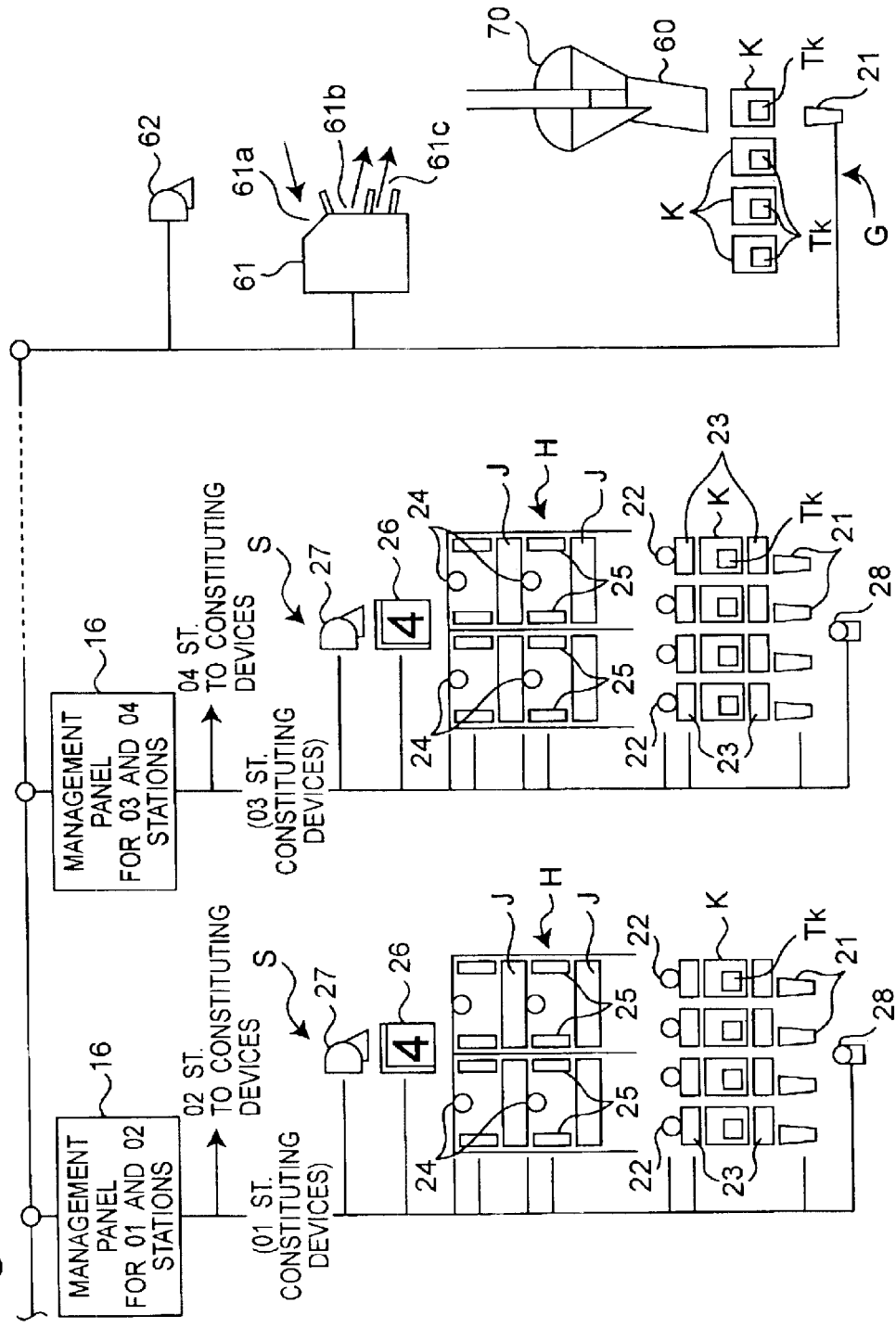
FIG. 8 is an explanatory drawing schematically showing an identification tag checking station in accordance with another embodiment of the present invention.

In this another embodiment, as shown in FIG. 8, in a side of a terminal end of the parts setting area F, in a downstream side of the terminal end setting work station S and an upstream side of the transfer apparatus Q1 (refer to FIG. 1), there is provided an identification tag checking station G. This checking station G is provided for checking whether or not the erroneous parts are received in the parts shelf H, on the basis of the parts information recorded on the identification tag 60 of the parts box J stored in the parts shelf H in the setting work station S.

The identification tag 60 mentioned above is attached per the parts boxes J, records the parts information such as a specification (kind, size, material and the like), the number and the parts code of the assembly parts received in the parts box J, for example, in a form of a bar code. The identification tag 60 is attached as it is to the parts box J at a time of storing the assembly parts in the predetermined shelf frontage of the parts shelf H as a whole of the parts boxes J, and is held in the storing portion of the parts box H.

A bar code reader 61, corresponding to a parts recording medium, capable of reading the parts information recorded in the identification tag 60 is provided in the identification tag checking station G. This bar code reader 61 is provided with an insert port 61a for inserting the identification tag 60, a first discharge port 61b for discharging the identification tag 60 in the case that a result of check is OK (acceptable), and a second discharge port 61c for discharging the identification tag 60 in the case that the result of check is NG (rejection).

The identification tag 60 is held in the parts box J in a state of being inserted into a holder (not shown) fixed to the parts box J, and is positioned at an easy access portion in a front side of the shelf frontage of the parts shelf H.

The worker in the setting work station S picks up the assembly parts together with the identification tag 60 held in the holder of the parts box J at a time of first picking up the assembly parts within the parts box J, and inserts the picked up identification tag 60 to a holder Kh (mentioned below, refer to FIG. 9) attached to the parts set container K. Accordingly, there is a case that a plurality of identification tags 60 are held within the identification tag holder Kh of one parts set container K, and there is a case that no identification tag 60 exists within that holder.

In the identification tag checking station G, more preferably, there is provided a picking apparatus 70 corresponding to a recording medium supplying device for picking up the identification tag 60 held by the holder Kh of the parts set container K from the holder mentioned above so as to automatically supply to the bar code reader 61 corresponding to the parts information reading device.

Figure 9:
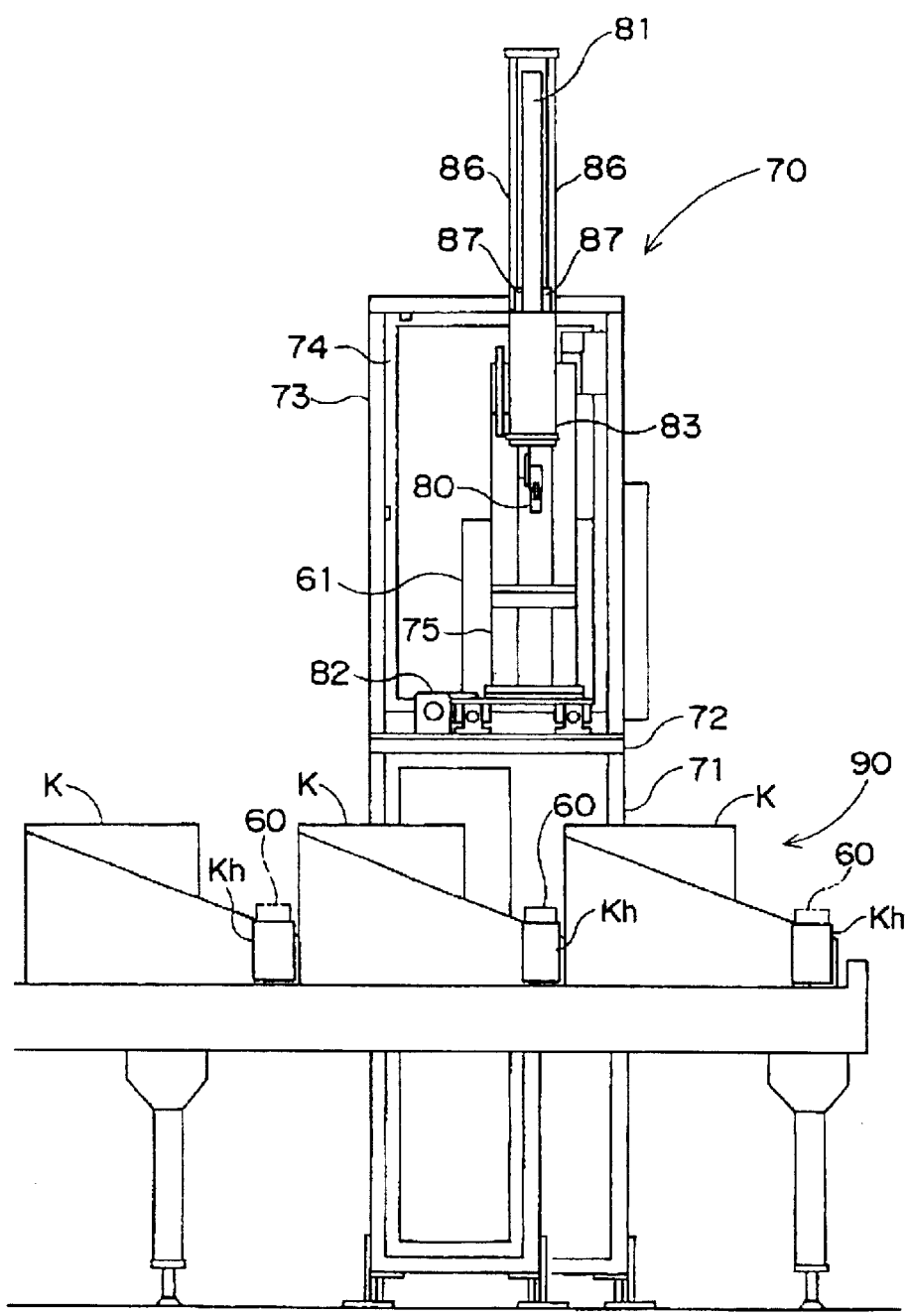
FIG. 9 is a front elevational explanatory view of a picking apparatus in accordance with the another embodiment mentioned above.
Figure 10:
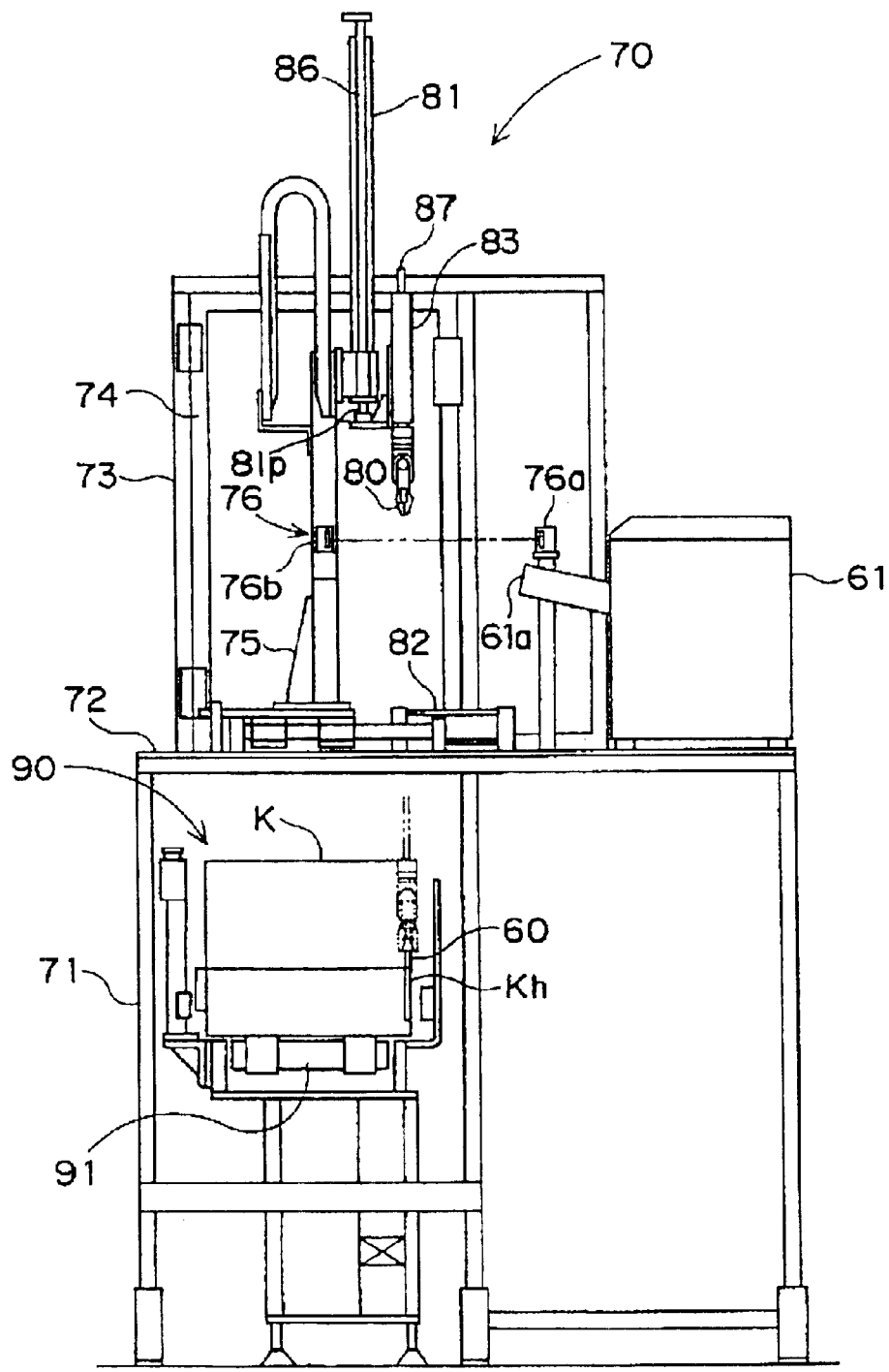
FIG. 10 is a side elevational explanatory view of the picking apparatus.

FIGS. 9 and 10 are a front elevational explanatory view and a side elevational explanatory view of the picking apparatus 70 mentioned above. As shown in these drawings, the picking apparatus 70 is provided above a transfer line 90 for feeding the parts set container K in which the required assembly parts are set from the parts set station S in a most downstream side to a further downstream side.

The picking apparatus 70 is provided with supporting columns 71 which are arranged so as to be astride the transfer line 90 having a lot of transfer roller 91, a base plate 72 which is fixed to an upper end of the supporting column 71, and a protection cover 74 which has a frame portion 73 arranged in an upper side of the base plate 72.

The base plate 72 is extended sideward and is commonly used as a base plate for mounting the bar code reader 61.

A basic pedestal 75 holding a chuck 80 via a first cylinder 81 is arranged on the base plate 72, and a second cylinder 82 for moving the basic pedestal 75 in a direction orthogonal to the transfer line 90 is arranged there The chuck 80 is structured such as to grip the identification tag 60 held by the holder Kh of the parts set container K, and is vertically moved in accordance with a vertical movement of a piston rod 81p of the first cylinder 81.

Figure 11:
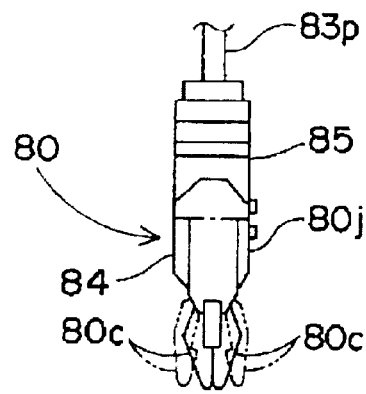
FIG. 11 is a side elevational explanatory view showing an open and close state of a chuck in the picking apparatus mentioned above.
Figure 12:
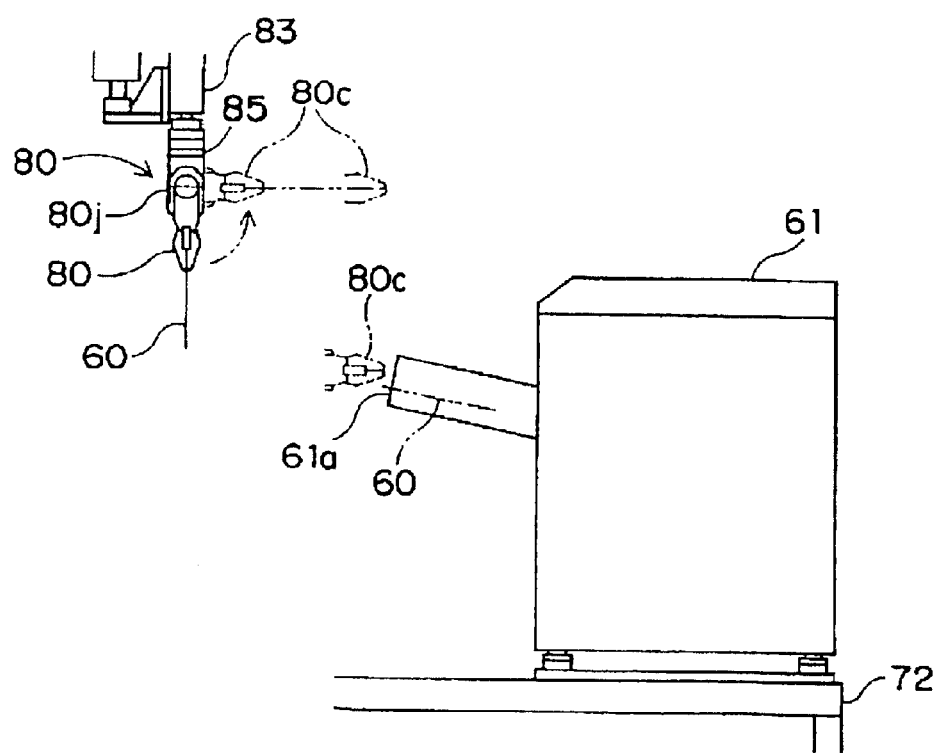
FIG. 12 is a side elevational explanatory showing a rotating state of the chuck mentioned above.

Further, a third cylinder 83 capable of further vertically moving the chuck 80 is mounted to a base portion in a leading end of the piston rod 81p of the first cylinder 81. The chuck 80 is mounted to a leading end side (a lower end side) of a piston rod 83p of the third cylinder 83. FIG. 11 shows a state in which claw portions 80c of the chuck 80 are driven so as to be opened and closed by a fourth cylinder 84, and FIG. 12 shows a state in which the chuck 80 is rotated around a joint portion 80j thereof by a fifth cylinder 85. In this case, reference numeral 86 denotes a guide rod for guiding the vertical movement of the chuck 80 at a time when the first cylinder 81 is operated, and reference numeral 87 denotes a guide rod for guiding the vertical movement of the chuck 80 at a time when the third cylinder 83 is operated.

In this case, all of the first, second, third, fourth and fifth cylinders 81, 82, 83, 84 and 85 are constituted by a cylinder apparatus, for example, of an air driven type, and more particularly, are structured such as to be connected to a control unit (not shown) of the picking apparatus 70 so as to be capable of sending and receiving signals, thereby being driven in correspondence to the control signal from the control unit.

Figure 13:
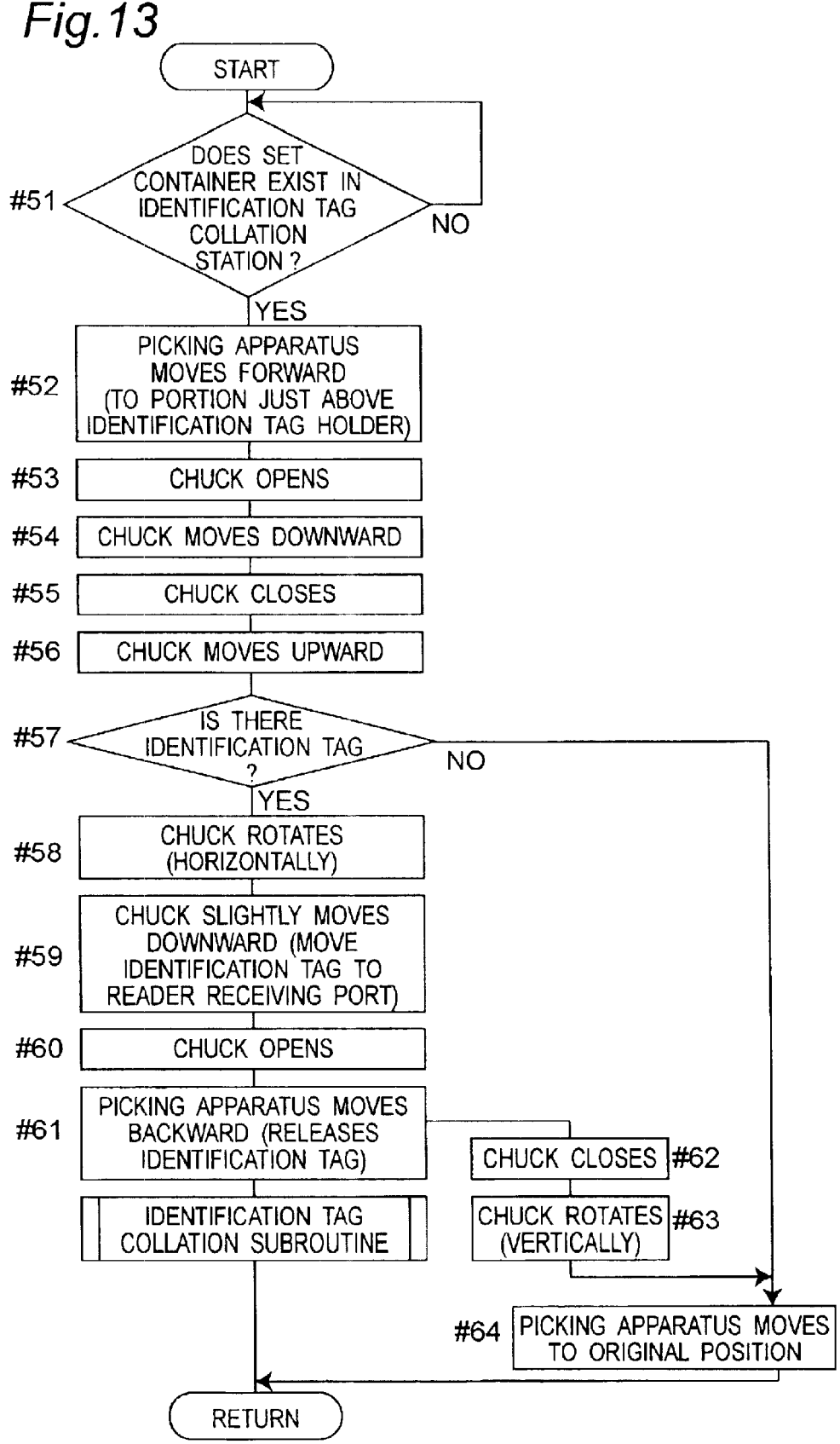
FIG. 13 is a flow chart for describing an automatic input of the identification tag to a bar code reader by the picking apparatus mentioned above.

In the constitution mentioned above, a description will be given of a step that the picking apparatus 70 automatically picks up the identification tag 60 from the holder Kh of the parts set container K so as to automatically input into the bar code reader 61, with reference to a flow chart in FIG. 13.

When the parts set container K on the transfer line 90 comes to the below of the picking apparatus 70, it is detected, for example, by a sensor (not shown) (step #51: YES). The position of the basic pedestal 75 is adjusted so that the chuck 80 of the picking apparatus 70 is positioned just above the holder Kh of the parts set container K (step #52), and the first and third cylinder 81 and 83 vertically move the chuck 80 downward. At this time, the chuck 80 moves downward in an open state of the claw portion 80c thereof (steps #53, #54).

Further, the chuck 80 reaches a position a predetermined amount above the holder Kh of the parts set container K, that is, a position at which the chuck 80 can grip the upper portion of the identification tag 60 in the case that the identification tag 60 is held by the holder Kh, and the claw portion 80c is closed (step #55). At this time, if the identification tag 60 is held by the holder Kh, the upper portion of the identification tag 60 is automatically gripped by the claw portion 80c.

When the closing motion of the claw portion 80c is finished, the chuck 80 is moved upward (step #56), and is returned to an initial position. A light receiving portion 76b of a photoelectric sensor 76 which is constituted, for example, by a light emitting portion 76a and the light receiving portion 76b, is mounted to a portion on the way in a vertical direction of the basic pedestal 75. And, the identification tag 60 is detected by the sensor 76 in the case that the chuck 80 grips the identification tag 60 (step #57).

Further, in the case that the chuck 80 grips the identification tag 60 (step #57: YES), as exemplified by FIG. 12, the chuck 80 is rotated approximately at 90 degrees by the fifth cylinder 85, and moves in a direction moving close to the bar code reader 61 by the second cylinder 82, and thereafter, the chuck 80 is moved downward so as to comply with a height of the insertion port 61a of the bar code reader 61 (steps #58, #59). Accordingly, the identification tag 60 held by the chuck 80 is inserted into the insertion port 61a of the bar code reader 61, the claw portion 80c of the chuck 80 is opened, and the identification tag 60 is automatically input into the bar code reader 61 (steps #60, #61).

Thereafter, the chuck 80 is returned to the original vertical state as well as the claw portion 80c is closed, and the picking apparatus 70 is returned to the original position (steps #62, #63, #64). In the case that the photoelectric sensor 76 does not detect the identification tag 60 (step #57: NO), the steps #58 to #63 are skipped, the step #64 is immediately executed, and the picking apparatus 70 is returned to the original position.

On the other hand, an identification tag collation subroutine is executed within the bar code reader 61 to which the identification tag 60 is input. That is, the parts information recorded on the identification tag 60 is read, and the parts information read here, and the assembly parts information corresponding to the parts set container K on the basis of the working instruction information output from the working instruction server 6 are collated.

Figure 14:
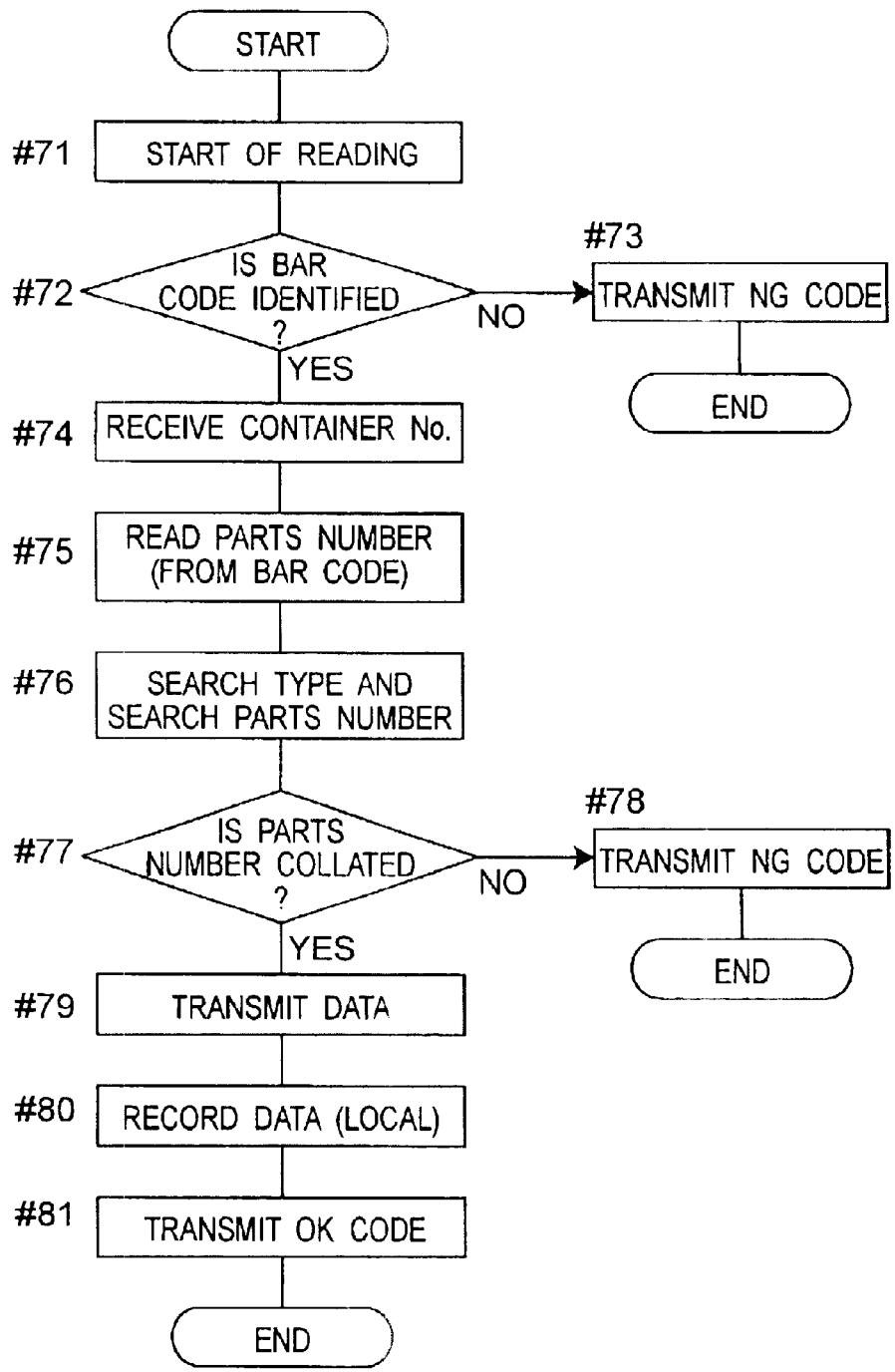
FIG. 14 is a flow chart for describing an identification tag collation subroutine executed within the bar code reader mentioned above.

When the identification tag 60 is input into the bar code reader 61, and the identification tag collation subroutine is started, reading the bar code on the identification tag 60 is started in a step #71, as shown in flow chart of FIG. 14. In this case, this bar code reading is, more preferably, started on the basis of a start instructing signal output from the main operational control panel 12 in the parts setting area F.

Next, it is judged in a step #72 whether or not the bar code can be identified. And, in the case that the judgement is NO, an NG code is transmitted to the main operational control panel 12 (step #73). In this case, more preferably, only in the case that the bar code can not be identified even by rereading at a predetermined number of times, the step #73 is executed, and this collation subroutine is finished. In this case, the identification tag 60 is discharged from the second discharge port (NG discharge port) 61c.

In the case that the result of judgement in the step #72 is YES, a container number of the parts set container K is received from the ID reader 21 mentioned below (step #74), and on the other hand, a parts number is read from the bar code (step #75).

Then, in a step #76, the type and the parts number with respect to the parts set container K are searched with reference to a working instruction information table from the working instruction server 6. And, the parts number based on this result of search and the parts number read from the bar code are collated (step #77).

It is to be noted that the ID reader 21 is arranged in the identification tag checking station G so as to be positioned near the parts set container K conveyed to the position corresponding to the picking apparatus 70 (refer to FIG. 8).

And, it is possible to read the assembly parts information stored in the ID tag Tk of the corresponding parts set container K by the ID reader 21. Accordingly, the structure is made, in the embodiment, such that the collation in the step #77 is carried out by using the assembly parts information read by the ID reader 21 and the container number, however, in place thereof, the structure may be made such as to receive the container number and the assembly parts information of the parts set container K from the main operational control panel 12.

In the case that the result of collation in the step #77 is NO, the identification tag 60 is in the wrong, so that the NG code is transmitted to the main operational control panel 12 (step #78), and then the collation subroutine is finished. In this case, the identification tag 60 is discharged from the second discharge port (NG discharge port) 61c. Further, in this case, since it is estimated that the storing of the parts box J to the shelf frontage in the parts shelf H has an error, the alarm buzzer 62 (refer to FIG. 8) is operated so as to inform the worker, and a corrective action is taken against the parts error. It is to be noted that the alarm buzzer 62 may be provided near the main operational control panel 12. Further, more preferably, a reset button which is operated after finishing the corrective action is provided near the alarm buzzer 62.

On the other hand, in the case that the result of judgement in the step #77 is YES, the data of the bar code on the read identification tag 60 is transmitted to the working instruction server 6 via the main operational control panel 12 (step #79), and is stored as a local data in the bar code reader 61 (step #80). Thereafter, an OK code is transmitted to the main operational control panel 12 (step #81), and the collation subroutine is finished. In this case, the identification tag 60 is discharged from the first discharge port (OK discharge port) 61b.

As described above, in accordance with the present embodiment, the same operation and effect as those of the embodiment described in FIGS. 1 to 7 can be achieved. And, in addition to this, it is possible to collate the identification tag 60 recording the parts information of the assembly parts received in the parts shelves H and the assembly parts information corresponding to the parts set container K on the basis of the working instruction information, and it is possible to inform of the result of collation Therefore, it is possible to prevent the erroneous parts from being set in the parts set container K even when the set mistake is not generated by the worker, and prevent the parts set container K to which the erroneous parts are set from being input to the assembling production line Lw. Further, in the case that the erroneous parts box J is received in the receiving portion of the parts shelf H, due to the error at a time of receiving the assembly parts in the parts shelf H, it is possible to securely detect the error mentioned above so as to take a corrective action. In particular, it is possible to do away with an unnecessary parts extraction operation by carrying out the collation mentioned above at a time of first taking out the parts after receiving the parts box J of the assembly parts in the parts shelf H.

Further, according to the another embodiment, the identification tag 60 is automatically supplied from the picking apparatus 70 at a time when the identification tag 60 held by the holder Kh of the parts set container K is picked up from the holder Kh so as to be supplied to the bar code reader 61. Therefore, it is possible to save labor for picking up the identification tag 60 from the holder Kh of the parts set container K and supplying the identification tag 60 to the bar code reader 61, and it is possible to reduce a load of the worker in the parts setting area F.

In this case, in the another embodiment mentioned above, the identification tag checking station G is provided in the tail end side of the parts setting area F, that is, in the most downstream side of the setting work station S, however, the identification tag checking station G can be provided in a direct downstream side of each of the setting work stations S. In this case, it is possible to extremely rapidly detect a matter that the erroneous parts box J is received in the receiving portion of the parts shelf H, and it is possible to immediately take a corrective action.

As described above, the present invention is not limited to the embodiments mentioned above, and it goes without saying that various improvements and various design changes can be carried out within the scope of the present invention.

What is claimed is:

1. A parts supplying system of an assembling production line in which different types of works may be assembled in the same line, comprising:
   a host computer outputting a production management information including a production order information for a plurality of works;
   a working instruction device for taking in said production management information corresponding to a preset number of works as an antecedent information coming before an actual parts preparing work, extracting the same type of works included in this intake production management information as the same type lot in a unit of a predetermined number so as to sort in an order of a parts preparing work, and generating a working instruction information including a parts preparing work order of the same type lot, said predetermined number and an assembly parts information relating to a kind and a number of the assembly parts to be assembled in said type of work each of the types;
   a plurality of set containers receiving a desired kind and number of assembly parts to be assembled in one work as one set of assembly parts set;
   a parts setting area having a working station provided with parts shelves for receiving the assembly parts therein by the kinds, and inputting said assembly parts set for the corresponding type of work to each of said set containers in the order of said parts preparing works by a unit of the same type lot, on the basis of said working instruction information; and
   a set container input mechanism for returning each of the set containers to which each of said assembly parts sets is input in said parts setting area in an order of the type in accordance with the production order in said assembling production line so as to input to said assembling production line.

2. A parts supplying system of an assembling production line as claimed in claim 1, wherein said set container input mechanism is provided with a set container temporarily storing device for temporarily storing each of the set containers each receiving said assembly parts set.

3. A parts supplying system of an assembling production line as claimed in claim 1, wherein a transfer route for transferring said set container together with said work in correspondence to the work flowing in said line is set in said assembling production line, and a set container temporarily extraction device for temporarily picking up said set container from said transfer route is provided in a part of said transfer route.

4. A parts supplying system of an assembling production line in which different types of works may be assembled in the same line, comprising:
   a host computer outputting a production management information including a production order information for a plurality of works;
   a working instruction device for taking in a part of said production management information as an antecedent information coming before an actual parts preparing work, and generating a working instruction information including an assembly parts information relating to a kind and a number of the assembly parts to be assembled in said type of work, in each of the types of the works included in this intake production management information;
   a plurality of set containers receiving a desired kind and number of assembly parts to be assembled in one work as one set of assembly parts set;
   a parts setting area having a working station provided with parts shelves for receiving the assembly parts therein by the kinds, and inputting said assembly parts set for the corresponding type of work to each of said set containers, on the basis of said working instruction information;
   a writing device for writing the assembly parts information corresponding to said set container on the basis of said working instruction information, with respect to a memory device provided in said set container, before inputting the assembly parts set to said set container in said parts setting area;
   a reading device for reading said assembly parts information stored in the memory device of said set container input to said working station;
   a display control device for displaying an object set container to be operated and the receiving portion of the parts shelves for an object parts to be received in said container, on the basis of said assembly parts information, at a time when said set containers are input to said working station;
   a parts extraction detecting device for detecting a state in which the parts are picked up from each of the receiving portions of said parts shelves;
   a parts receiving detecting device for detecting a state in which the parts are received in said set containers; and
   an informing device for informing a worker in said working station of a state in which at least any one of said parts receiving detecting device and said parts extraction detecting device is different from said working instruction information, at a time when the state is detected.

5. A parts supplying system of an assembling production line as claimed in claim 4, wherein the parts supplying system is provided with a working finish instructing device which is operated after the receiving work of the assembly parts in said set container is finished, said working finish instructing device is set such as to be capable of transmitting a working finish signal to said informing device, and said informing device informs the worker of the case that said working finish signal is received in a state in which the receiving work of the assembly parts is not finished after the display is carried out by said display control device.

6. A parts supplying system of an assembling production line as claimed in claim 5, wherein said working finish instructing device is operated after finishing the operation of receiving said assembly parts in said set container with respect to each of kinds of said assembly parts.

7. A parts supplying system of an assembling production line as claimed in claim 4, wherein said parts extraction detecting device and/or said parts receiving detecting device is provided with an optical sensor.

8. A parts supplying system of an assembling production line in which different types of works may be assembled in the same line, comprising:
- a host computer outputting a production management information including a production order information for a plurality of works;
- a working instruction device for taking in a part of said production management information as an antecedent information coming before an actual parts preparing work, and generating a working instruction information including an assembly parts information relating to a kind and a number of the assembly parts to be assembled in said type of work, in each of the types of the works included in this intake production management information;
- a plurality of set containers receiving a desired kind and number of assembly parts to be assembled in one work as one set of assembly parts set;
- a parts setting area having a working station provided with parts shelves for receiving the assembly parts therein by the kinds, and inputting said assembly parts set for the corresponding type of work to each of said set containers, on the basis of said working instruction information;
- a parts recording medium which is held in the received portion of said assembly parts at a time of receiving said assembly parts in said parts shelves, and records parts information of said assembly parts;
- a recording medium holding device which is provided in said set container and is capable of holding said parts recording medium taken out from said parts shelves;
- a parts information reading device for reading the parts information recorded in said parts recording medium;
- a parts information collating device for collating the parts information read by said parts information reading device and the assembly parts information corresponding to said set container on the basis of said working instruction information; and
- a collated result informing device for informing of a collated result by said parts information collating device.

9. A parts supplying system of an assembling production line as claimed in claim 8, wherein the parts supplying system is further provided with a recording medium supplying device for picking up said parts recording medium held by the recording medium holding device of said set container from said recording medium holding device so as to automatically supply to said parts information reading device.

10. A parts supplying system of an assembling production line as claimed in any one of claims 4 to 9, wherein said working instruction device takes in said production management information corresponding to a preset number of works as an antecedent information coming before an actual parts preparing work, extracts the same type of works included in this intake production management information as the same type lot in a unit of a predetermined number so as to sort in an order of a parts preparing work, generates a working instruction information including a parts preparing work order of the same type lot, said predetermined number and an assembly parts information relating to a kind and a number of the assembly parts to be assembled in said type of work each of the types;
in said parts setting area, said assembly parts set for the corresponding type of work is input to each of said set containers in the order of said parts preparing works by a unit of the same type lot, on the basis of said working instruction information; and
there is provided a set container inputting device which returns each of the set containers from said parts setting area in an order of the type in accordance with the production order in said assembling production line so as to input to said assembling production line.

11. A parts supplying system of an assembling production line as claimed in claim 10, wherein said set container input mechanism is provided with a set container temporarily storing device for temporarily storing each of the set containers each receiving said assembly parts set.

12. A parts supplying system of an assembling production line as claimed in claims 4, wherein a transfer route for transferring said set container together with said work in correspondence to the work flowing in said line is set in said assembling production line, and a set container temporarily extraction device for temporarily picking up said set container from said transfer route is provided in a part of said transfer route.

13. A parts supplying method of an assembling production line in which different types of works may be assembled in the same line, comprising:
- a step of outputting a production management information including a production order information for a plurality of works form a host computer;
- a step of taking in said production management information corresponding to a preset number of works as an antecedent information coming before an actual parts preparing work, extracting the same type of works included in this intake production management information as the same type lot in a unit of a predetermined number so as to sort in an order of a parts preparing work, and generating a working instruction information including a parts preparing work order of the same type lot, said predetermined number and an assembly parts information relating to a kind and a number of the assembly parts to be assembled in said type of work each of the types;
- a step of preparing a plurality of set containers receiving a desired kind and number of assembly parts to be assembled in one work as one set of assembly parts set, and inputting said assembly parts set for the corresponding type of work to each of said set containers in the order of said parts preparing works by a unit of the same type lot, on the basis of said working instruction information, in a operation area provided with parts shelves for receiving the assembly parts therein by the kinds; and
- a step of returning each of the set containers to which each of said assembly parts sets is input in an order of the type in accordance with the production order in said assembling production line so as to input to said assembling production line.

14. A parts supplying method of an assembling production line as claimed in claim 13, wherein each of said set containers is temporarily stored in a storing device, at a time of returning each of said set containers to the order of the types in accordance with the production order in said assembling production line so as to input to said assembling production line.

15. A parts supplying method of an assembling production line as claimed in claim 13, wherein a transfer route for transferring said set container together with said work in correspondence to the work flowing in said line is set in said assembling production line, and a set container temporarily extraction device for temporarily picking up said set container from said transfer route is provided in a part of said transfer route.

16. A parts supplying method of an assembling production line in which different types of works may be assembled in the same line, comprising:

a step of outputting a production management information including a production order information for a plurality of works from a host computer;

a step of taking in a part of said production management information as an antecedent information coming before an actual parts preparing work, and generating a working instruction information including an assembly parts information relating to a kind and a number of the assembly parts to be assembled in said type of work, in each of the types of the works included in this intake production management information;

a step of preparing a plurality of set containers receiving a desired kind and number of assembly parts to be assembled in one work as one set of assembly parts set, and inputting said assembly parts set for the corresponding type of work to each of said set containers, in a parts setting area having a working station provided with parts shelves for receiving the assembly parts therein by the kinds;

a step of writing the assembly parts information corresponding to said set container on the basis of said working instruction information, with respect to a memory device provided in said set container, before inputting the assembly parts set to said set container;

a step of reading said assembly parts information stored in the memory device of said set container input to said working station;

a step of displaying an object set container to be operated and the receiving portion of the parts shelves for an object parts to be received in said container, on the basis of said assembly parts information, at a time when said set containers are input to said working station;

a step of detecting a state in which the parts are picked up from each of the receiving portions of said parts shelves;

a step of detecting a state in which the parts are received in said set containers; and a step of informing a worker in said operation area of a state in which at least any one of said parts receive state and said parts extraction state is different from said working instruction information, at a time when the state is detected.

17. A parts supplying method of an assembling production line as claimed in claim 16, wherein the parts supplying system is provided with a working finish instructing device which is operated after the receiving work of the assembly parts in said set container is finished, and the worker is informed of the matter that a working finish signal is received from said working finish instructing device in a state in which the receiving work of the assembly parts in the set container is not finished after the display of the set container to be operated and the receiving portion of the parts shelves for the parts to be received are displayed, in the case that such a matter is generated.

18. A parts supplying method of an assembling production line as claimed in claim 17, wherein said working finish instructing device is operated after finishing the operation of receiving said assembly parts in said set container with respect to each of kinds of said assembly parts.

19. A parts supplying method of an assembling production line as claimed in claim 16, wherein said parts extraction detection and/or said parts receive detection is provided with an optical sensor.

20. A parts supplying method of an assembling production line in which different types of works may be assembled in the same line, comprising:

a step of outputting a production management information including a production order information for a plurality of works from a host computer;

a step of taking in a part of said production management information as an antecedent information coming before an actual parts preparing work, and generating a working instruction information including an assembly parts information relating to a kind and a number of the assembly parts to be assembled in said type of work, in each of the types of the works included in this intake production management information;

a step of preparing a plurality of set containers receiving a desired kind and number of assembly parts to be assembled in one work as one set of assembly parts set, and inputting said assembly parts set for the corresponding type of work to each of said set containers, in a parts setting area having a working station provided with parts shelves for receiving the assembly parts therein by the kinds;

a step of making parts recording medium recording parts information of said assembly parts be held in the received portion of said assembly parts, at a time of receiving said assembly parts in said parts shelves;

a step of picking up said parts recording medium from said parts shelves at a time of picking up said assembly parts from said parts shelves so as to input to said container, and making the parts recording medium be held by a recording medium holding device which is provided in said set container;

a step of reading the parts information recorded in said parts recording medium by a parts information reading device;

a step of collating the parts information read by said parts information reading device and the assembly parts information corresponding to said set container on the basis of said working instruction information by a parts information collating device; and a step of informing of a collated result by said parts information collating device by a collated result informing device.

21. A parts supplying method of an assembling production line as claimed in claim 20, wherein the parts supplying method further comprises a step of automatically supplying said parts recording medium by a recording medium supplying device, at a time of picking up said parts recording medium held by the recording medium holding device of said set container from said recording medium holding device so as to automatically supply to said parts information reading device.

22. A parts supplying method of an assembling production line as claimed in any one of claims 16 to 21, wherein said step of generating the working instruction information comprises a step of taking in said production management information corresponding to a preset number of works as an antecedent information coming before an actual parts preparing work, extracting the same type of works included in this intake production management information as the same type lot in a unit of a predetermined number so as to sort in an order of a parts preparing work, and generating a working instruction information including a parts preparing work order of the same type lot, said predetermined number and an assembly parts information relating to a kind and a number of the assembly parts to be assembled in said type of work each of the types;

said step of inputting said assembly parts set to each of said set containers comprises a step of inputting said assembly parts set for the corresponding type of work to each of said set containers in the order of said parts preparing works by a unit of the same type lot, on the basis of said working instruction information; and each of the set containers each of which said assembly parts set is input to is returned in an order of the type in accordance with the production order in said assembling production line so as to input to said assembling production line.

23. A parts supplying method of an assembling production line as claimed in claim 22, wherein each of said set containers is temporarily stored in a storing device, at a time of returning each of said set containers to the order of the types in accordance with the production order in said assembling production line so as to input to said assembling production line.

24. A parts supplying method of an assembling production line as claimed in any one of claims 16, wherein a transfer route for transferring said set container together with said work in correspondence to the work flowing in said line is set in said assembling production line, and a set container temporarily extraction device for temporarily picking up said set container from said transfer route is provided in a part of said transfer route.

* * * * *